US009250005B2

(12) United States Patent
Oomura et al.

(10) Patent No.: US 9,250,005 B2
(45) Date of Patent: Feb. 2, 2016

(54) AIR CONDITIONER FOR VEHICLE WITH HEAT PUMP CYCLE

(71) Applicant: DENSO CORPORATION, Kariya, Aichi-pref. (JP)

(72) Inventors: Mitsuyo Oomura, Hekinan (JP); Hiroyuki Hayashi, Obu (JP); Yukihiko Takeda, Nagoya (JP); Yoshinori Ichishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/535,406

(22) Filed: Nov. 7, 2014

(65) Prior Publication Data

US 2015/0059375 A1    Mar. 5, 2015

Related U.S. Application Data

(62) Division of application No. 12/803,812, filed on Jul. 7, 2010, now Pat. No. 8,966,928.

(30) Foreign Application Priority Data

Jul. 8, 2009 (JP) ................................. 2009-161455

(51) Int. Cl.
*F25B 47/02* (2006.01)
*F25D 21/00* (2006.01)
(Continued)

(52) U.S. Cl.
CPC .......... *F25D 21/004* (2013.01); *B60H 1/00785* (2013.01); *B60H 1/00921* (2013.01);
(Continued)

(58) Field of Classification Search
CPC ........... B60H 1/00742; B60H 1/00778; B60H 1/00785; B60H 1/321; B60H 47/02; B60H 47/025; B60H 2001/2234
See application file for complete search history.

(56) References Cited

U.S. PATENT DOCUMENTS 5,544,493 A * 8/1996 Suzuki et al. ................... 62/133
5,586,448 A * 12/1996 Ikeda ................. B60H 1/00392
62/156

(Continued)

FOREIGN PATENT DOCUMENTS

JP           07-1954         1/1995
JP           09-257388       10/1997
(Continued)

OTHER PUBLICATIONS

Office Action issued Dec. 18, 2012 in corresponding JP Application No. 2009-161455 with English translation.
(Continued)

*Primary Examiner* — Jonathan Bradford
(74) *Attorney, Agent, or Firm* — Harness, Dickey & Pierce, P.L.C.

(57) ABSTRACT

An air conditioner for a vehicle includes a vapor compression refrigeration cycle switchable between a heat pump cycle and a cooler cycle, a heat core configured to heat air to be blown into a vehicle compartment by using coolant of an engine of the vehicle as a heat source, and a controller configured to control operation of the vapor compression refrigeration cycle. The controller controls the vapor compression refrigeration cycle to be operated as the cooler cycle so as to perform a defrosting control of the outdoor heat exchanger, and outputs an operation request signal to the engine, when the controller determines that the outdoor heat exchanger is frosted.

5 Claims, 16 Drawing Sheets

(51) Int. Cl.
  *B60H 1/00* (2006.01)
  *B60H 1/32* (2006.01)
  *F25B 6/04* (2006.01)
  *F25B 41/04* (2006.01)
  *F25B 30/02* (2006.01)

(52) U.S. Cl.
  CPC  *B60H1/321* (2013.01); *F25B 6/04* (2013.01); *F25B 30/02* (2013.01); *F25B 41/04* (2013.01); *F25B 47/02* (2013.01); *B60H 2001/3266* (2013.01)

(56) References Cited

U.S. PATENT DOCUMENTS

| | | | |
|---|---|---|---|
| 6,237,357 | B1 | 5/2001 | Hirao et al. |
| 6,430,951 | B1 | 8/2002 | Iritani et al. |
| 7,140,427 | B2 | 11/2006 | Honda et al. |
| 2002/0036080 | A1 | 3/2002 | Itoh et al. |
| 2004/0144107 | A1 | 7/2004 | Breton et al. |
| 2004/0206102 | A1 | 10/2004 | Homan et al. |
| 2005/0056413 | A1 | 3/2005 | Homan et al. |
| 2006/0270333 | A1 | 11/2006 | Hirai |
| 2007/0235006 | A1 | 10/2007 | Nishigaki et al. |
| 2010/0326127 | A1 | 12/2010 | Oomura et al. |

FOREIGN PATENT DOCUMENTS

| | | |
|---|---|---|
| JP | 09-286225 | 11/1997 |
| JP | 2000-343934 | 12/2000 |
| JP | 2002-174474 | 6/2002 |
| JP | 2004-332710 | 11/2004 |
| JP | 2007-8449 | 1/2007 |
| JP | 2008-221997 | 9/2008 |

OTHER PUBLICATIONS

Office Action issued Jul. 30, 2013 in corresponding JP Application No. 2009-161455 with English translation.

* cited by examiner

FIG. 7

```
              S14      FROM S13
                 ↘        │
     ┌────────────────────▼──────────────────────────────┐
     │ READ OPERATING MODE DETERMINED IN S6 TO MEMORY CYCLE_VALVE │ ~S14a
     └────────────────────┬──────────────────────────────┘
                          │
              NO     ╱ SYSTEM STOP? ╲ ~S14b
         ┌──────────╲              ╱
         │           ╲ YES ╱
         │              │
         │    ┌─────────▼──────────┐
         │    │ CYCLE_VALVE = COOL CYCLE │ ~S14c
         │    └─────────┬──────────┘
         └──────────────┤
                        ▼
```

| CYCLE_VALVE | VALVE 13 | VALVE 20 | VALVE 17 | VALVE 24 | VALVE 21 |
|---|---|---|---|---|---|
| COOL | OFF | OFF | OFF | OFF | OFF |
| HOT | ON | ON | ON | OFF | OFF |
| DRY_EVA | ON | OFF | ON | ON | ON |
| DRY_ALL | ON | OFF | ON | ON | OFF |

| | COOLER CYCLE | HEAT PUMP CYCLE | | |
|---|---|---|---|---|
| | | WITHOUT DEHUMIDIFICATION | WITH DEHUMIDIFICATION | |
| | COOLING MODE (COOL CYCLE) | HEATING MODE (HOT CYCLE) | FIRST DEHUMIDIFICATION MODE (DRY_EVA CYCLE) | SECOND DEHUMIDIFICATION MODE (DRY_ALL CYCLE) |
| DEHUMIDIFICATION CAPACITY | LARGE | NO | MIDDLE | SMALL |
| HEATING CAPACITY | NO | LARGE | SMALL | MIDDLE |

| ΔfH | | PRESSURE DEVIATION (Pn) | | | | | | |
|---|---|---|---|---|---|---|---|---|
| | | -0.5 | -0.3 | -0.1 | 0 | 0.1 | 1.5 | 3 |
| PDOT | 0.50 | 700 | 600 | 500 | 600 | 700 | 800 | 1000 |
| | 0.30 | 200 | 300 | 400 | 500 | 600 | 700 | 2000 |
| | 0.20 | 100 | 150 | 200 | 300 | 400 | 1000 | 2000 |
| | 0.00 | -200 | -150 | -50 | 0 | 50 | 700 | 1800 |
| | -0.20 | -500 | -400 | -350 | -300 | -250 | 400 | 1500 |
| | -0.3 | -600 | -600 | -550 | -450 | -350 | 300 | 800 |
| | -0.50 | -800 | -750 | -700 | -600 | -500 | 100 | 400 |

AIR CONDITIONER FOR VEHICLE WITH HEAT PUMP CYCLE

CROSS REFERENCE TO RELATED APPLICATION

This application is a divisional of U.S. patent application Ser. No. 12/803,812 filed on Jul. 7, 2010. This application is based on Japanese Patent Application No. 2009-161455 filed on Jul. 8, 2009, the contents of which are incorporated herein by reference in its entirety.

FIELD OF THE INVENTION

The present invention relates to an air conditioner for a vehicle, which is provided with a vapor compression refrigeration cycle switchable between a heat pump cycle and a cooler cycle.

BACKGROUND OF THE INVENTION

Conventionally, in a vehicle air conditioner provided with a heat pump cycle, when an outdoor heat exchanger of the heat pump cycle is frosted, the heat pump cycle is switched to a cooler cycle, thereby defrosting the outdoor heat exchanger.

JP-A-2002-174474 describes regarding a vehicle air conditioner that is provided with a heat pump cycle and a heater core. The heater core heats air to be blown into a vehicle compartment by using engine coolant as a heat source. In the vehicle air conditioner, in a case where an outdoor heat exchanger of the heat pump cycle is frosted, if the temperature of engine coolant is higher than a predetermined temperature, the heat pump cycle is switched to a cooler cycle, thereby defrosting the outdoor heat exchanger.

However, in the vehicle air conditioner, when the heat pump cycle is switched to the cooler cycle so that the defrosting of the outdoor heat exchanger of the heat pump cycle is performed, if the defrosting time is long, a heating feeling given to a passenger in the vehicle compartment is deteriorated.

Furthermore, in the vehicle air conditioner described in JP-A-2002-174474, when an engine operation is not necessary as a driving source of a vehicle traveling, such as in a case of an idling-stop vehicle or a hybrid car, it is difficult to obtain a sufficient heating feeling in the defrosting operation.

Thus, in the vehicle air conditioner, when the engine is stopped at a low temperature of the engine coolant, the defrosting can not be performed during the engine stop. Alternatively, when the heating operation using the heat pump cycle is switched to the defrosting operation using the cooler cycle, a heat source necessary for the heating operation is insufficient, and thereby the temperature of air to be blown into the vehicle compartment is decreased. Therefore, the heating feeling given to a passenger in the vehicle compartment is deteriorated.

SUMMARY OF THE INVENTION

In view of the foregoing problems, it is an object of the present invention to provide an air conditioner for a vehicle, which improves heating feeling given to a passenger in a vehicle compartment during a defrosting control of an outdoor heat exchanger.

It is another object of the present invention to provide an air conditioner for a vehicle, which improves heating feeling given to a passenger in a vehicle compartment during a defrosting control of an outdoor heat exchanger while improving fuel consumption and reducing exhaust gas amount.

It is another object of the present invention to provide an air conditioner for a vehicle, which can effectively reduce a defrosting time in a defrosting control of an outdoor heat exchanger.

According to an aspect of the present invention, an air conditioner for a vehicle includes: a vapor compression refrigeration cycle including an outdoor heat exchanger configured to perform heat exchange between refrigerant and air outside of a vehicle compartment, and an indoor heat exchanger configured to perform heat exchange between the refrigerant and air to be blown into the vehicle compartment; a heat core configured to heat air to be blown into the vehicle compartment by using coolant of an engine of the vehicle as a heat source; and a controller configured to control operation of the vapor compression refrigeration cycle. The vapor compression refrigerant cycle is configured to be switchable between a heat pump cycle in which a heat amount absorbed from the outdoor heat exchanger is radiated to the indoor heat exchanger to heat air to be blown into the vehicle compartment, and a cooler cycle in which a heat amount absorbed from the indoor heat exchanger is radiated to the outdoor heat exchanger. In the air conditioner, the controller controls the vapor compression refrigeration cycle to be operated as the cooler cycle so as to perform a defrosting control of the outdoor heat exchanger, and outputs an operation request signal to the engine, when the controller determines that the outdoor heat exchanger is frosted.

Accordingly, when the engine is stopped in a case where the outdoor heat exchanger is frosted, the operation request signal is output to the engine, thereby operating the engine. Therefore, it is possible to perform the heating of the vehicle compartment by using coolant of the engine as a heat source, so that the heat source for the heating of the vehicle compartment can be secured even in the defrosting control. Thus, heating feeling given to a passenger in the vehicle compartment can be improved during the defrosting control of the outdoor heat exchanger.

For example, in a case where the controller determines that the outdoor heat exchanger is frosted, the controller causes the vapor compression refrigeration cycle to be operated as the heat pump cycle when a temperature of the coolant is lower than a predetermined temperature, and causes the vapor compression refrigeration cycle to be operated as the cooler cycle so as to perform the defrosting control of the outdoor heat exchanger when the temperature of the coolant is higher than the predetermined temperature.

Alternatively, the controller may perform the defrosting control of the outdoor heat exchanger when a temperature of the refrigerant flowing through the outdoor heat exchanger is lower than a determination value in the heat pump cycle. In this case, the controller sets the determination value at a first temperature when the engine is in operating, and sets the determination value at a second temperature lower than the first temperature when the engine is stopped. Thus, heating feeling given to a passenger in the vehicle compartment can be improved during the defrosting control of the outdoor heat exchanger while improving a fuel consumption and reducing an exhaust gas amount.

The air conditioner may further include an economic switch configured to switch an economic mode by an operation of a passenger in which a power saving of the vapor compression refrigeration cycle is preferentially performed, and an electrical heater which generates heat to heat air to be blown into the vehicle compartment. In this case, the controller outputs the operation request signal to the engine and causes the electrical heater to be operated, when the controller determines that the outdoor heat exchanger is frosted in a case where the economic mode is set by the economic switch.

Furthermore, the controller may finish the defrosting control when the temperature of the refrigerant flowing through the outdoor heat exchanger is higher than a predetermined temperature in the defrosting control.

Alternatively, when the controller performs the defrosting control, a defrosting time for performing the defrosting control may be set at a first predetermined time when a temperature of the outside air is lower than a predetermined temperature, and may be set at a second predetermined time that is shorter than the first predetermined time when the temperature of the outside air is higher than the predetermined temperature.

The air conditioner may further include an electrical heater which generates heat to heat air to be blown into the vehicle compartment. In this case, the controller outputs the operation request signal to the engine, when a room temperature of the vehicle compartment is lower than a predetermined temperature so that a heating feeling given to a passenger is determined to be lowered in a case where the controller determines that the outdoor heat exchanger is frosted. In contrast, the controller does not output the operation request signal to the engine and causes the electrical heater to be operated, when the room temperature of the vehicle compartment is higher than the predetermined temperature so that the heating feeling given to a passenger is determined to be higher, even in a case where the controller determines that the outdoor heat exchanger is frosted.

Furthermore, the controller may set a target temperature of the indoor heat exchanger in the defrosting control to be lower than a target temperature of the indoor heat exchanger in a control operation of the cooler cycle, other than the defrosting control.

According to another aspect of the present invention, an air conditioner for a vehicle includes a vapor compression refrigeration cycle including an outdoor heat exchanger configured to perform heat exchange between refrigerant and air outside of a vehicle compartment, and an indoor heat exchanger configured to perform heat exchange between the refrigerant and air to be blown into the vehicle compartment. The vapor compression refrigerant cycle is configured to be switchable between a heat pump cycle in which a heat amount absorbed from the outdoor heat exchanger is radiated to the indoor heat exchanger to heat air to be blown into the vehicle compartment, and a cooler cycle in which a heat amount absorbed from the indoor heat exchanger is radiated to the outdoor heat exchanger. In the air conditioner, a controller causes the vapor compression refrigeration cycle to be operated as the cooler cycle so as to perform a defrosting control of the outdoor heat exchanger, when the controller determines that the outdoor heat exchanger is frosted. Furthermore, in a case where the controller determines that the outdoor heat exchanger is frosted, the controller prohibits the defrosting control when performing a pre-air conditioning control which starts air conditioning in the vehicle compartment before the passenger rides on the vehicle, and performs the defrosting control when the pre-air conditioning control is not performed. Thus, it can prevent heating of the vehicle compartment from being lowered in the pre-air conditioning control.

According to another aspect of the present invention, an air conditioner for a vehicle includes a vapor compression refrigeration cycle including an outdoor heat exchanger configured to perform heat exchange between refrigerant and air outside of a vehicle compartment, and an indoor heat exchanger configured to perform heat exchange between the refrigerant and air to be blown into the vehicle compartment. The vapor compression refrigerant cycle is configured to be switchable between a heat pump cycle in which a heat amount absorbed from the outdoor heat exchanger is radiated to the indoor heat exchanger to heat air to be blown into the vehicle compartment, and a cooler cycle in which a heat amount absorbed from the indoor heat exchanger is radiated to the outdoor heat exchanger. A controller configured to control the vapor compression refrigeration cycle causes the vapor compression refrigeration cycle to be operated as the cooler cycle so as to perform a defrosting control of the outdoor heat exchanger, when the controller determines that the outdoor heat exchanger is frosted. Furthermore, the outdoor heat exchanger is arranged to be tilted with respect to a vertical direction such that a flow direction of air passing through the outdoor heat exchanger is toward a lower side than a horizontal direction. In this case, water or ice included in the water can easily fall downwardly, thereby effectively reducing the defrosting time.

According to another aspect of the present invention, an air conditioner for a vehicle includes a vapor compression refrigeration cycle including an outdoor heat exchanger configured to perform heat exchange between refrigerant and air outside of a vehicle compartment, and an indoor heat exchanger configured to perform heat exchange between the refrigerant and air to be blown into the vehicle compartment. The vapor compression refrigerant cycle is configured to be switchable between a heat pump cycle in which a heat amount absorbed from the outdoor heat exchanger is radiated to the indoor heat exchanger to heat air to be blown into the vehicle compartment, and a cooler cycle in which a heat amount absorbed from the indoor heat exchanger is radiated to the outdoor heat exchanger. In the air conditioner, an outdoor blower is located for blowing air to the outdoor heat exchanger, and a controller is configured to control the vapor compression refrigeration cycle and an operating ratio of the outdoor blower. Furthermore, the controller causes the vapor compression refrigeration cycle to be operated as the cooler cycle so as to perform a defrosting control of the outdoor heat exchanger, when the controller determines that the outdoor heat exchanger is frosted. In the air conditioner, when a temperature of the outside air is higher than a predetermined temperature of an ice melting temperature area in the defrosting control, the controller controls the operating ratio of the outdoor blower to be higher than that when the temperature of the outside air is lower than the predetermined temperature of the ice melting temperature area in the defrosting control. Accordingly, the defrosting time can be effectively reduced, and heating feeling given to a passenger in the vehicle compartment can be improved.

According to another aspect of the present invention, an air conditioner for a vehicle includes a vapor compression refrigeration cycle including an outdoor heat exchanger configured to perform heat exchange between refrigerant and air outside of a vehicle compartment, and an indoor heat exchanger configured to perform heat exchange between the refrigerant and air to be blown into the vehicle compartment. The vapor compression refrigerant cycle is configured to be switchable between a heat pump cycle in which a heat amount absorbed from the outdoor heat exchanger is radiated to the indoor heat exchanger to heat air to be blown into the vehicle compartment, and a cooler cycle in which a heat amount absorbed from the indoor heat exchanger is radiated to the outdoor heat exchanger. In the air conditioner, an outdoor blower is located for blowing air to the outdoor heat exchanger, and a controller is configured to control the vapor compression refrigeration cycle and an operating ratio of the outdoor blower. Furthermore, the controller causes the vapor compression refrigeration cycle to be operated as the cooler cycle so as to perform a defrosting control of the outdoor heat exchanger, when the controller determines that the outdoor heat exchanger is frosted. In this case, when a temperature of the outside air is lower than a predetermined temperature of a freezing temperature area in the defrosting control, the controller controls the operating ratio of the outdoor blower to be lower than that when the temperature of the outside air is higher than the predetermined temperature in the defrosting control. Accordingly, the defrosting time can be effectively reduced, and heating feeling given to a passenger in the vehicle compartment can be improved.

Alternatively, when the controller determines that an ice-melting of frost attached to the outdoor heat exchanger proceeds in the defrosting control, the controller controls the operating ratio of the outdoor blower to be higher than that when the ice-melting of frost attached to the outdoor heat exchanger is not proceeding in the defrosting control. Thus, the defrosting time can be effectively reduced, and heating feeling given to a passenger in the vehicle compartment can be improved.

Alternatively, at an initial defrosting stage before melting of frost attached to the outdoor heat exchanger proceeds during the defrosting control, the controller controls the operating ratio of the outdoor blower to be lower than that at a stage other than the initial defrosting stage during the defrosting control. Thus, the defrosting time can be effectively reduced, and heating feeling given to a passenger in the vehicle compartment can be improved.

BRIEF DESCRIPTION OF THE DRAWINGS

Other objects, features and advantages of the present invention will become more apparent from the following description made with reference to the accompanying drawings, in which like parts are designated by like reference numbers and in which:

FIG. 7 is a flowchart showing a detail control at step S14 of FIG. 6;

FIG. 8 is a diagram showing dehumidifying capacity and heating capacity in respective operation modes of the air conditioner for a vehicle in the first embodiment;

DETAILED DESCRIPTION OF EMBODIMENTS

Figure 1:
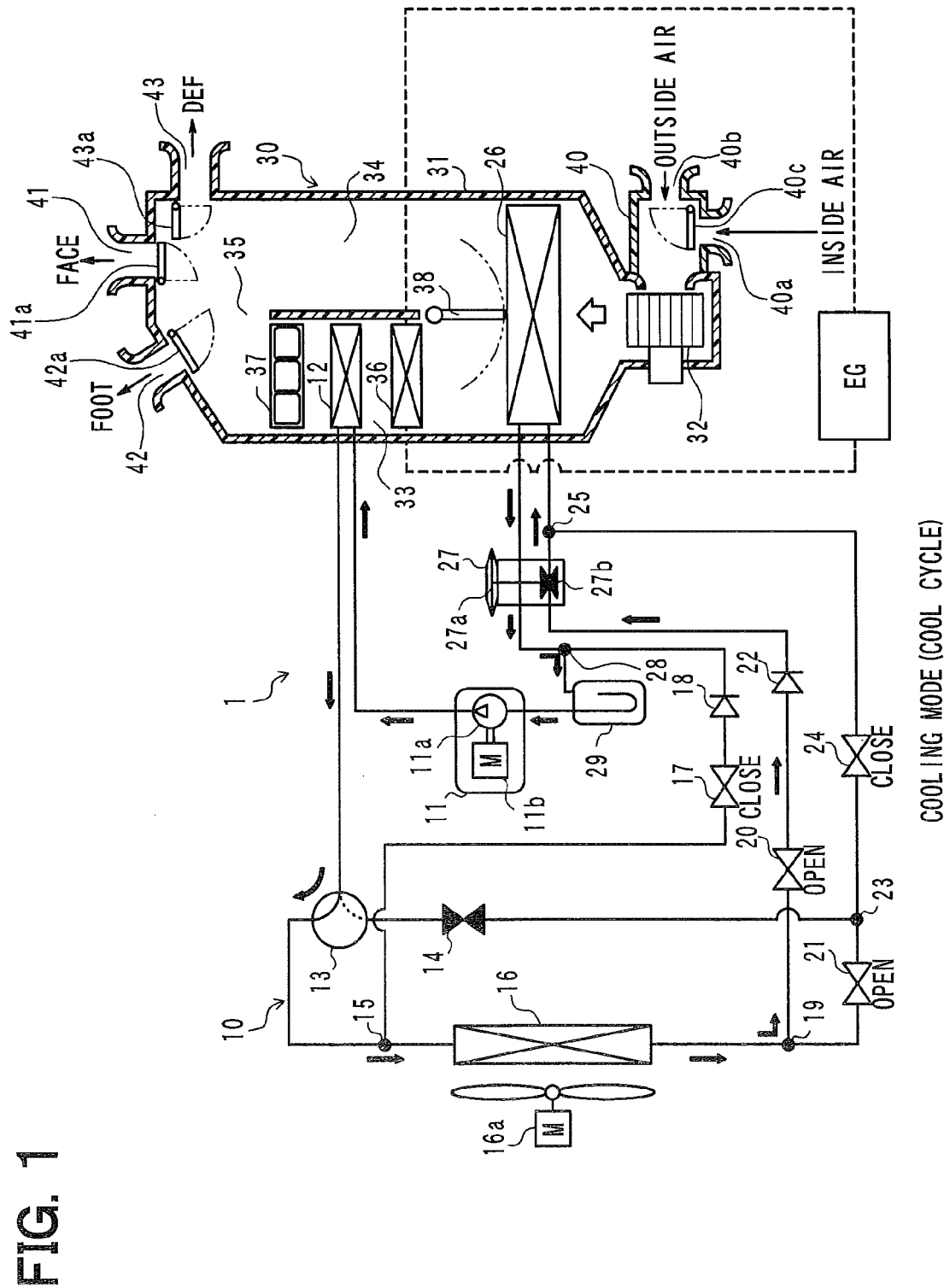
FIG. 1 is an entire configuration diagram showing an air conditioner for a vehicle with a refrigerant circuit in a cooling mode according to a first embodiment of the invention.

Embodiments for carrying out the present invention will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the invention will be described below with reference to FIGS. 1 to 10. In the present embodiment, an air conditioner for a vehicle of the invention is applied to the so-called hybrid car which obtains a driving force for a vehicle traveling from an internal combustion engine (engine) EG and an electric motor for traveling. FIGS. 1 to 4 show an entire configuration diagram of an air conditioner 1 for a vehicle, according to the first embodiment and the following embodiments described later.

The air conditioner for a vehicle includes a vapor compression refrigeration cycle 10 which can switch among refrigerant circuits in a cooling mode (cooler cycle (i.e., COOL cycle)) for cooling the vehicle interior (i.e., vehicle compartment), in a heating mode (HOT cycle) for heating the vehicle interior, and in a first dehumidification mode (DRY_EVA cycle) and in a second dehumidification mode (DRY_ALL cycle) for dehumidifying the vehicle interior. FIGS. 1 to 4 indicate the flows of refrigerant in the cooling mode, the heating mode, the first dehumidification mode, and the second dehumidification mode by respective solid lines.

The cooling mode is an operation mode causing the refrigeration cycle 10 to be in a cooler cycle (i.e., COOL cycle), so as to have cooling capacity and dehumidification capacity. Thus, the cooling mode can be represented as a cooling dehumidification mode.

The heating mode and the first and second dehumidification modes are modes in which the refrigeration cycle 10 is operated as a heat pump cycle. In the three modes using the heat pump cycle, the heating mode has a high heating capacity but does not have the dehumidification capacity. Thus, the heating mode is used in a heat pump cycle without dehumidifying.

In the three modes using the heat pump cycle, the first and second dehumidification modes have the dehumidification capacity, but have the heating capacity lower than that in the heating mode. Thus, the first and second dehumidification modes are operated as a heat pump cycle having the dehumidification capacities.

The first dehumidification mode is a dehumidification mode which puts higher priority on a dehumidification capacity than a heating capacity. The second dehumidification mode is a dehumidification mode which puts higher priority on a heating capacity than the dehumidification capacity. Therefore, the first dehumidification mode can be represented by a low-temperature dehumidification mode or a single dehumidification mode, and the second dehumidification mode can be represented by a high-temperature dehumidification mode or a dehumidification heating mode.

FIG. 8 shows the dehumidification capacity and the heating capacity in cooling mode, the heating mode, the first and second dehumidification modes. That is, in the cooling mode, the dehumidification capacity is large, but there is no the heating capacity. Thus, when the cooling mode is selected in the heating, a heating device (e.g., heater core 36, PTC heater 37 described later) other than the refrigeration cycle 10 is combined to be operated.

In the heating mode, the heating capacity is large, but there is no the dehumidification capacity. In the first dehumidification mode, the dehumidification capacity is middle, but the heating capacity is small. In the second dehumidification mode, the dehumidification capacity is small, but the heating capacity is middle.

The refrigeration cycle 10 includes a compressor 11, an indoor condenser 12 and an indoor evaporator 26 serving as an indoor heat exchanger, a thermal expansion valve 27 and a fixed throttle 14 serving as decompression means for decompressing and expanding refrigerant, and a plurality of (in the present embodiment, five) electromagnetic valves 13, 17, 20, 21, 24, and the like serving as refrigerant circuit switching means.

The refrigeration cycle 10 employs a normal flon-based refrigerant as the refrigerant, and thus forms a subcritical refrigeration cycle in which high-pressure side refrigerant pressure does not exceed the critical pressure of the refrigerant. Further, a refrigerating machine oil for lubricating the compressor 11 is mixed with the refrigerant. The refrigerating machine oil circulates through the cycle together with the refrigerant.

The compressor 11 is positioned in an engine room, and is to suck, compress, and discharge the refrigerant in the refrigeration cycle 10. The compressor is an electric compressor which drives a fixed displacement compressor mechanism 11a having a fixed discharge capacity by using an electric motor 11b. Specifically, various types of compressor mechanisms, such as a scroll type compressor mechanism, or a vane compressor mechanism, can be employed as the fixed displacement compressor mechanism 11a.

The electric motor 11b is an AC motor whose operation (number of revolutions) is controlled by an AC voltage output from an inverter 61. The inverter 61 outputs an AC voltage of a frequency corresponding to a control signal output from an air conditioning controller 50 to be described later. The control of the number of revolutions changes a refrigerant discharge capacity of the compressor 11. Thus, the electric motor 11b serves as discharge capacity changing means of the compressor 11.

The refrigerant discharge side of the compressor 11 is coupled to the refrigerant inlet side of the indoor condenser 12. The indoor condenser 12 is disposed in a casing 31 forming an air passage through which air flows into the vehicle interior in an indoor air conditioning unit 30 of the air conditioner for a vehicle. The indoor condenser 12 is a heat exchanger for heating the air by exchanging heat between the refrigerant flowing therethrough and the air having passed through an indoor evaporator 26 to be described later. The details of the indoor air conditioning unit 30 will be described later.

The refrigerant outlet side of the indoor condenser 12 is coupled to an electric three-way valve 13. The electric three-way valve 13 is refrigerant circuit switching means its operation is controlled by a control voltage output from the air conditioning controller 50.

More specifically, in an energization state with power supplied, the electric three-way valve 13 performs switching to a refrigerant circuit coupling between the refrigerant outlet side of the indoor condenser 12 and the refrigerant inlet side of the fixed throttle 14. In a non-energization state without power supplied, the three-way valve 13 performs switching to a refrigerant circuit coupling between the refrigerant outlet side of the indoor condenser 12 and one of refrigerant inlet and outlet ports of a first three-way joint 15.

The fixed throttle 14 is decompression means for heating and dehumidifying, and is adapted to decompress and expand the refrigerant flowing from the electric three-way valve 13 in the heating mode, and the first and second dehumidification modes. For example, a capillary tube, an orifice, or the like can be adapted as the fixed throttle 14. Alternatively, the decompression means for heating and dehumidifying may employ an electric variable throttle mechanism whose throttle passage area is adjusted by a control signal output from the air conditioning controller 50. The refrigerant outlet side of the fixed throttle 14 is coupled to one of the refrigerant inflow/outlet ports of a three-way joint 23 to be described later.

The first three-way joint 15 includes three refrigerant inlet/outlet ports, and serves as a branch portion for branching a refrigerant flow path. Such a three-way joint may be provided by connecting refrigerant pipes, or by forming a plurality of refrigerant passages in a metal block or resin block. Another refrigerant inlet/outlet port of the first three-way joint 15 is coupled to one of the refrigerant inlet/outlet ports of the outdoor heat exchanger 16, and a further refrigerant inlet/outlet port of the three-way joint 15 is coupled to the refrigerant inlet side of the low-voltage electromagnetic valve 17.

The low-voltage electromagnetic valve 17 includes a valve body for opening and closing a refrigerant flow path, and a solenoid (coil) for driving the valve body. The electromagnetic valve 17 is refrigerant circuit switching means whose operation is controlled by a control voltage output from the air conditioning controller 50. More specifically, the low-voltage electromagnetic valve 17 is the so-called normally-closed type opening and closing valve which is opened upon energization and closed upon non-energization.

The refrigerant outlet side of the low-voltage electromagnetic valve 17 is coupled to one of the refrigerant inlet/outlet ports of a fifth three-way joint 28 to be described later via a first check valve 18. The first check valve 18 allows only the refrigerant to flow from the low-voltage electromagnetic valve 17 to the fifth three-way joint 28.

The outdoor heat exchanger 16 is disposed in the engine room, and is to exchange heat between the refrigerant flowing therethrough and air (i.e., outside air) outside a vehicle compartment blown from a blower fan 16a. The blower fan 16a is an electric blower whose number of revolutions (amount of air) is controlled by a control voltage output from the air conditioning controller 50.

The blower fan 16a of the present embodiment blows the outside air not only to the outdoor heat exchanger 16, but also to a radiator (not shown) for radiating heat from coolant of the engine EG. Specifically, the air outside the vehicle compartment blown from the blower fan 16a flows through the outdoor heat exchanger 16 and the radiator in that order.

In coolant circuits indicated by broken lines shown in FIGS. 1 to 4, a coolant pump (not shown) is provided for allowing a coolant to circulate therethrough. The coolant pump is an electric water pump whose number of revolutions (amount of coolant circulating) is controlled by a control voltage output from the air conditioning controller 50.

The other one of the refrigerant inlet/outlet ports of the outdoor heat exchanger 16 is coupled to one of the refrigerant inlet/outlet ports of the second three-way joint 19. The basic structure of the second three-way joint 19 is the same as that of the first three-way joint 15. Another one of the refrigerant inlet/outlet ports of the second three-way joint 19 is coupled to the refrigerant inlet side of the high-voltage electromagnetic valve 20, and a further one of the refrigerant inlet/outlet ports is coupled to one of the refrigerant inlet and outlet ports of the electromagnetic valve 21 for interruption of the heat exchanger.

The high-voltage electromagnetic valve 20 and the heat-exchanger interruption electromagnetic valve 21 are refrigerant circuit switching means whose operation is controlled by a control voltage output from the air conditioning controller 50. The basic structure of the valves 20 and 21 is the same as that of the low-voltage electromagnetic valve 17. The high-voltage electromagnetic valve 20 and the heat-exchanger interruption electromagnetic valve 21 are formed as the so-called normally-opened type opening and closing valve designed to be closed upon energization and opened upon non-energization.

The refrigerant outlet side of the high-voltage electromagnetic valve 20 is coupled to an inlet of a throttle mechanism of a thermal expansion valve 27 to be described later via a second check valve 22. The second check vale 22 allows only the refrigerant to flow from the high-voltage electromagnetic valve 20 to the thermal expansion valve 27.

The other one of the refrigerant inlet/outlet ports of the heat exchanger interruption electromagnetic vale 21 is coupled to one of the refrigerant inlet/outlet ports of the third three-way joint 23. The basic structure of the third three-way joint 23 is the same as that of the first three-way joint 15. Another one of the refrigerant inlet/outlet ports of the third three-way joint 23 is coupled to the refrigerant outlet side of the fixed throttle 14 as mentioned above. A further one of the refrigerant inlet/outlet ports of the joint 23 is coupled to the refrigerant inlet side of the dehumidifying electromagnetic valve 24.

The dehumidifying electromagnetic valve 24 is refrigerant circuit switching means whose operation is controlled by a control voltage output from the air conditioning controller 50. The basic structure of the valve 24 is the same as that of the low-voltage electromagnetic valve 17. The dehumidifying electromagnetic valve 24 also serves as a normally-closed type opening and closing valve. The refrigerant circuit switching means of the present embodiment is comprised of (five) electromagnetic valves which are adapted to be brought into a predetermined opened or closed state when the supply of power is stopped. The electromagnetic valves include the electric three-way valve 13, the low-voltage electromagnetic valve 17, the high-voltage electromagnetic valve 20, the heat exchanger interruption electromagnetic valve 21, and the dehumidifying electromagnetic valve 24.

The refrigerant outlet side of the dehumidifying electromagnetic valve 24 is coupled to one of the refrigerant inlet/outlet ports of a fourth three-way joint 25. The basic structure of the fourth three-way joint 25 is the same as that of the first three-way joint 15. Another one of the refrigerant inlet/outlet ports of the fourth three-way joint 25 is coupled to the outlet side of the throttle mechanism of the thermal expansion valve 27, and a further one of the refrigerant inlet/outlet ports is coupled to the refrigerant inlet side of the indoor evaporator 26.

The indoor evaporator 26 is disposed on the upstream side of the air flow of the indoor condenser 12 in a casing 31 of the indoor air conditioning unit 30. The indoor evaporator 26 is a heat exchanger for cooling air by exchanging heat between the air and the refrigerant flowing therethrough.

The refrigerant outlet side of the indoor evaporator 26 is coupled to the inlet side of a temperature sensing portion of the thermal expansion valve 27. The thermal expansion valve 27 is decompression means for cooling which decompresses and expands the refrigerant flowing from the inlet of the throttle mechanism thereinto to allow the refrigerant to flow outward from the outlet of the throttle mechanism.

More specifically, the thermal expansion valve 27 used in the present embodiment is an internal pressure equalizing expansion valve which accommodates in one housing, a temperature sensing portion 27a and a variable throttle mechanism 27b. The temperature sensing portion 27a is provided for detecting the degree of superheat of the refrigerant on the outlet side of the indoor evaporator 26 based on the temperature and pressure of the refrigerant on the outlet side of the indoor evaporator 26. The variable throttle mechanism 27b is provided for adjusting a throttle passage area (refrigerant flow rate) based on a displacement of the temperature sensing portion 27a such that the superheat degree of the refrigerant on the outlet side of the evaporator 26 is in a predetermined range.

The outlet side of the temperature sensing portion of the thermal expansion valve 27 is coupled to one of the refrigerant inlet and outlet ports of the fifth three-way joint 28. The basic structure of the fifth three-way joint 28 is the same as that of the first three-way joint 15. As mentioned above, another one of the refrigerant inlet and outlet ports of the fifth three-way joint 28 is coupled to the refrigerant outlet side of the fifth check valve 18, and a further one of the refrigerant inlet and outlet ports is coupled to the refrigerant inlet side of an accumulator 29.

The accumulator 29 is a low-pressure side vapor-liquid separator which is adapted to separate the refrigerant flowing thereinto from the fifth three-way joint 28 and to store the excessive refrigerant. The vapor-phase refrigerant outlet of the accumulator 29 is coupled to a refrigerant suction port of the compressor 11.

Now, the indoor air conditioning unit 30 will be described below. The indoor air conditioning unit 30 is disposed inside a dashboard (i.e., instrument panel) at the foremost part of the interior of the vehicle. The unit 30 accommodates in the casing 31 serving as an outer envelope, a blower 32, the above-mentioned indoor evaporator 26, the indoor condenser 12, a heater core 36, a PTC heater 37, and the like.

The casing 31 forms an air passage of air blown into the vehicle interior. The casing 31 is formed of resin (for example, polypropylene) having some degree of elasticity and excellent strength. An inside/outside air switching box 40 for switching between an inside air (i.e., air inside the vehicle compartment) and an outside air (i.e., air outside the vehicle compartment) to introduce the selected air is disposed on the most upstream side of the air flow in the casing 31.

More specifically, the inside/outside air switching box 40 is provided with an inside air inlet 40a for introducing the inside air into the casing 31, and an outside air inlet 40b for introducing the outside air thereinto. The inside/outside air switching box 40 has therein an inside/outside air switching door 40c for changing the ratio of an amount of the inside air to an amount of the outside air by continuously adjusting opening areas of the inside air inlet 40a and outside air inlet 40b.

The inside/outside air switching door 40c serves as air amount ratio changing means for switching among suction port modes to change the ratio of the inside air amount to the outside air amount introduced into the casing 31. More specifically, the inside/outside air switching door 40c is driven by an electric actuator 62 for the inside/outside air switching door 40c. The electric actuator 62 has its operation controlled by a control signal output from the air conditioning controller 50.

The suction port modes include an inside air mode, an outside air mode, and an inside and outside air mixing mode. In the inside air mode, the inside air is introduced into the casing 31 by fully opening the inside air inlet 40a, while completely closing the outside air inlet 40b. In the outside air mode, the outside air is introduced into the casing 31 by completely closing the inside air inlet 40a, while fully opening the outside air inlet 40b. In the inside and outside air mixing mode, the ratio of an introduced amount of inside air to an introduced amount of outside air is continuously changed by adjusting the opening areas of the inside air inlet 40a and outside air inlet 40b in a continuous manner between the inside air mode and the outside air mode.

The blower 32 for blowing air sucked via the inside/outside air switching box 40 into the vehicle interior is disposed on the downstream side of the air flow of the inside/outside air switching box 40. The blower 32 is an electric blower which includes a centrifugal multiblade fan (e.g., sirocco fan) driven by an electric motor, and whose number of revolutions is controlled by the control voltage output from the air conditioning controller 50, thereby controlling air blowing amount.

The indoor evaporator 26 is disposed on the downstream side of the air flow of the blower 32. Further, a heating air passage 33 for allowing air passing through the indoor evaporator 26 to flow therethrough, an air passage including a cool air bypath passage 34, and a mixing space 35 for mixing air from the heating air passage 33 and the cool air bypass passage 34 are formed on the downstream side of the air flow of the indoor evaporator 26.

In the heating air passage 33, the heater core 36, the indoor condenser 12, and the PTC heater 37 are arranged in that order along the direction of air flow so as to serve as heating means for heating air passing through the indoor evaporator 26. The heater core 36 and the PTC heater 37 can be adapted as a heating means for heating air by using a heat source other than the refrigerant.

The heater core 36 is a heat exchanger for heating air having passed through the indoor evaporator 26 by exchanging heat between coolant of the engine EG for outputting a driving force for vehicle traveling, and air having passed through the indoor evaporator 26.

The PTC heater 37 is an electric heater with a PTC element (positive characteristic thermistor) which produces heat by being supplied with power thereby to heat air having passed through the indoor condenser 12. The air conditioner is provided with a plurality of PTC heaters 37 (specifically, three). The air conditioning controller 50 controls the heating capacity of the whole PTC heaters 37 by changing the number of the PTC heaters 37 energized.

On the other hand, the cool air bypass passage 34 is an air passage for allowing the air having passed through the indoor evaporator 26 to be introduced into the mixing space 35 without passing through the heater core 36, the indoor condenser 12, and the PTC heater 37. Thus, the temperature of the air mixed in the mixing space 35 is changed by the ratio of the amount of air passing through the heating air passage 33 to the amount of air passing through the cool bypass passage 34.

In the present embodiment, an air mix door 38 is provided for continuously changing the ratio of the amount of cool air flowing into the heating air passage 33 to that of cool air flowing into the cool air bypass passage 34, on the downstream side of the air flow of the indoor evaporator 26, and on the inlet sides of the heating air passage 33 and the cool air bypass passage 34.

Thus, the air mix door 38 serves as temperature adjustment means for adjusting the temperature of air in the mixing space 35, thereby adjusting temperature of air blown into the vehicle interior. More specifically, the air mix door 38 is driven by an electric actuator 63 for the air mix door. The electric actuator 63 has its operation controlled by a control signal output from the air conditioning controller 50.

Air outlets 41-43 for blowing the air, whose temperature is adjusted, from the mixing space 35 into the vehicle interior as a space to be cooled are disposed on the most downstream side of the air flow in the casing 31. The air outlets 41-43 include, specifically, a face air outlet 41 from which conditioned air is blown toward an upper body of a passenger in the vehicle compartment, a foot air outlet 42 from which conditioned air is blown toward a foot of the passenger, and a defroster air outlet 43 from which conditioned air is blown toward the inner side of a front windowpane of the vehicle.

A face door 41a for adjusting the area of an opening of the face air outlet 41 is positioned on the upstream side of the air flow of the face air outlet. A foot door 42a for adjusting the area of an opening of the foot air outlet 42 is positioned on the upstream side of the air flow of the foot air outlet 42. A defroster door 43a for adjusting the area of an opening of the defroster air outlet 43 is positioned on the upstream side of the air flow of the defroster air outlet 43.

The face door 41a, the foot door 42a, and the defroster door 43a serve as air outlet mode switching means for switching among air outlet modes, and are rotatably operated in connection and cooperation with the electric actuator 64 for driving the air outlet mode door via a link mechanism (not shown). The electric actuator 64 also has its operation controlled by the control signal output from the air conditioning controller 50.

The air outlet modes include a face mode, a bi-level mode, a foot mode, and a foot/defroster mode. In the face mode, air is blown from the face air outlet 41 toward the upper body of the passenger in the vehicle compartment by fully opening the face air outlet 41. In the bi-level mode, air is blown toward the upper body and foot of the passenger in the vehicle compartment by fully opening both of the face air outlet 41 and the foot air outlet 42. In the foot mode, air is blown mainly from the foot air outlet 42 by fully opening the foot air outlet 42, while opening the defroster air outlet 43 to a small degree of opening. In the foot/defroster mode, air is blown from both the foot air outlet 42 and the defroster air outlet 43 by opening the foot air outlet 42 and the defroster air outlet 43 to the same degree.

An air outlet mode switch 60c of an operation panel 60 to be described later is manually operated by the passenger, so that the defroster air outlet 43 is fully opened thereby to enable setting of a defroster mode for blowing air from the defroster air outlet 43 toward the inner face of the front windowpane of the vehicle.

When the foot mode is selected as the air outlet mode, air is blown from at least the foot air outlet 42. When the foot/defroster mode or the defroster mode is selected, a flow amount ratio of air blown from the defroster air outlet 43 is made larger than that in the foot mode, thereby preventing defogging in the front windowpane of the vehicle. Thus, the foot/defroster mode and the defroster mode are adapted as a defogging mode.

A hybrid car to which the air conditioner 1 for a vehicle of the present embodiment is applied includes an electric heating defogger 47 and a seat heating device 48, in addition to the air conditioner for a vehicle. The electric heating defogger 47 is a heating wire disposed inside or on the surface of the inner face of the windowpane in the vehicle compartment, and is to prevent fog or to defog by heating the windowpane. Also, the electric heating defogger 47 can have its operation controlled by a control signal output from the air conditioning controller 50.

The seat heating device 48 is disposed inside or on the surface of the seat of the vehicle compartment, to directly warm the body of a passenger, so as to improve the heating feeling. In the present embodiment, the seat heating device 48 is a heating wire that generates heat by electrical current.

The operation of the electrical heating defogger 47 and the seat heating device 48 can be controlled by control signals output from the air conditioning controller 50.

Figure 5:
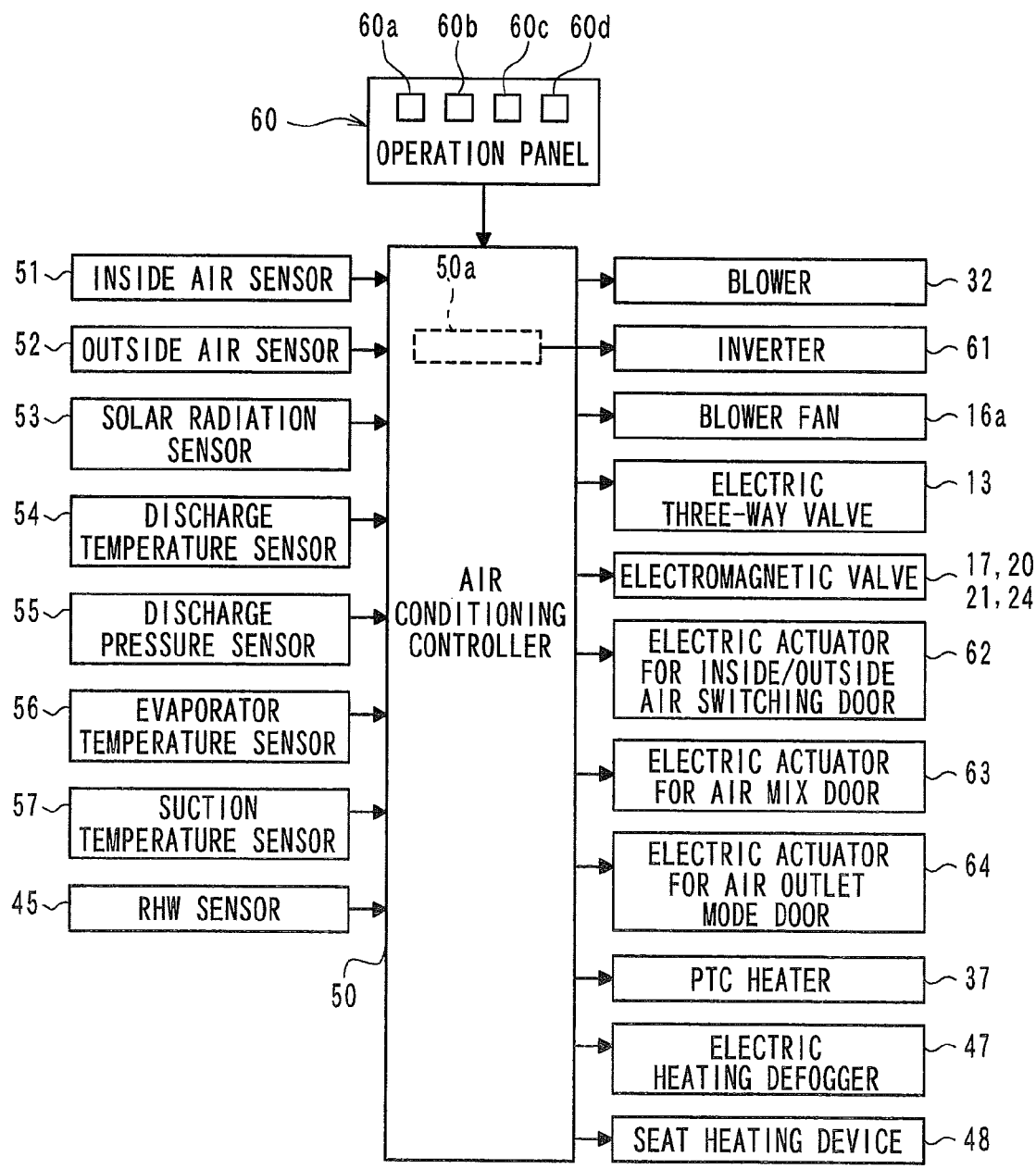
FIG. 5 is a block diagram showing an electric controller of the air conditioner for a vehicle in the first embodiment.

Now, an electric controller of the present embodiment will be described below with reference to FIG. 5. The air conditioning controller 50 is configured by a known microcomputer, including CPU, ROM, and RAM, and a peripheral circuit thereof. The controller 50 performs various kinds of computations and processing based on air conditioning control programs stored in the ROM thereby to control the operations of the inverter 61 for the electric motor 11b of the compressor 11 coupled to the output side, the respective electromagnetic valves 13, 17, 20, 21, and 24 serving as the refrigerant circuit switching means, the blower fan 16a, the blower 32, and various types of electric actuators 62, 63, 64 or the like.

The air conditioning controller 50 has the control means for controlling the above various components integrated therewith. In the present embodiment, especially, the air conditioning controller 50 is configured to perform a switch control of the cooling mode, the heating mode, and the first and second dehumidification modes.

In the present embodiment, the air conditioning controller 50 includes therein a discharge capacity control means 50a adapted to control operation of the electrical motor 11b that is a discharge capacity changing means of the compressor 11. The discharge capacity control means may be configured separately from the air conditioning controller 50.

Detection signals from a group of sensors are input to the input side of the air conditioning controller 50. The sensors include an inside air sensor 51 for detecting a temperature Tr of the interior of a vehicle compartment, an outside air sensor 52 (outside air temperature detection means) for detecting an outside air temperature Tam, and a solar radiation sensor 53 for detecting an amount of solar radiation Ts in the vehicle interior. And, the sensors also include a discharge temperature sensor 54 (discharge temperature detection means) for detecting a discharged refrigerant temperature Td of the compressor 11, and a discharge pressure sensor 55 (discharge pressure detection means) for detecting a refrigerant pressure Pd on the discharge side (high-pressure side refrigerant pressure) of the compressor 11. Further, the sensors include an evaporator temperature sensor 56 (evaporator temperature detection means) for detecting a blown-air temperature (evaporator temperature) Te of air from the indoor evaporator 26, and a suction temperature sensor 57 for detecting a temperature Tsi of the refrigerant flowing through between the first three-way joint 15 and the low-pressure electromagnetic valve 17. Moreover, the sensors include a coolant temperature sensor for detecting an engine coolant temperature Tw, and a RHW sensor 45 for detecting a relative humidity RHW of air in the vehicle interior near the windowpane therein or on the windowpane.

Specifically, the evaporator temperature sensor 56 detects the temperature of a heat exchanging fin of the indoor evaporator 26. Temperature detection means for detecting the temperature of other parts of the indoor evaporator 26 may be employed as the evaporator temperature sensor 56. Alternatively, temperature detection means for directly detecting the temperature of refrigerant itself flowing through the indoor evaporator 26 may be employed as the evaporator temperature sensor 56.

The RHW sensor 45 is configured by three sensors such as a humidity sensor for detecting a relative humidity RHW of air in the vehicle compartment near the windowpane of the vehicle, a near-windowpane temperature sensor for detecting an air temperature in the vehicle compartment near the windowpane, and a windowpane surface temperature sensor for detecting a surface temperature of the windowpane.

In the present embodiment, the RHW sensor 45 is arranged on the surface of the windowpane of the vehicle, at a side position of the rearview mirror that is positioned at a center upper portion of the windowpane of the vehicle, for example.

The input side of the air conditioning controller 50 receives input of an operation signal from each of various types of air conditioning operation switches provided in the operation panel 60 disposed near the instrument panel on the front side of the vehicle compartment. Various types of air conditioning operation switches provided in the operation panel 60 include, specifically, an operation switch (not shown) for the air conditioner 1 for a vehicle, an air conditioning switch 60a for switching on/off of the compressor 11 thereby switching on/off of the air conditioning, an automatic switch (not shown) for setting and releasing an automatic control of the air conditioner 1, a selector switch for an operating mode, a suction mode switch 60b for selectively switching an air suction mode, the air outlet mode switch 60c for selecting an air outlet mode, an air amount setting switch for the blower 32, a vehicle interior temperature setting switch, an economy switch 60d for outputting a command for giving higher priority on power saving of the refrigeration cycle, or the like.

Figure 6:
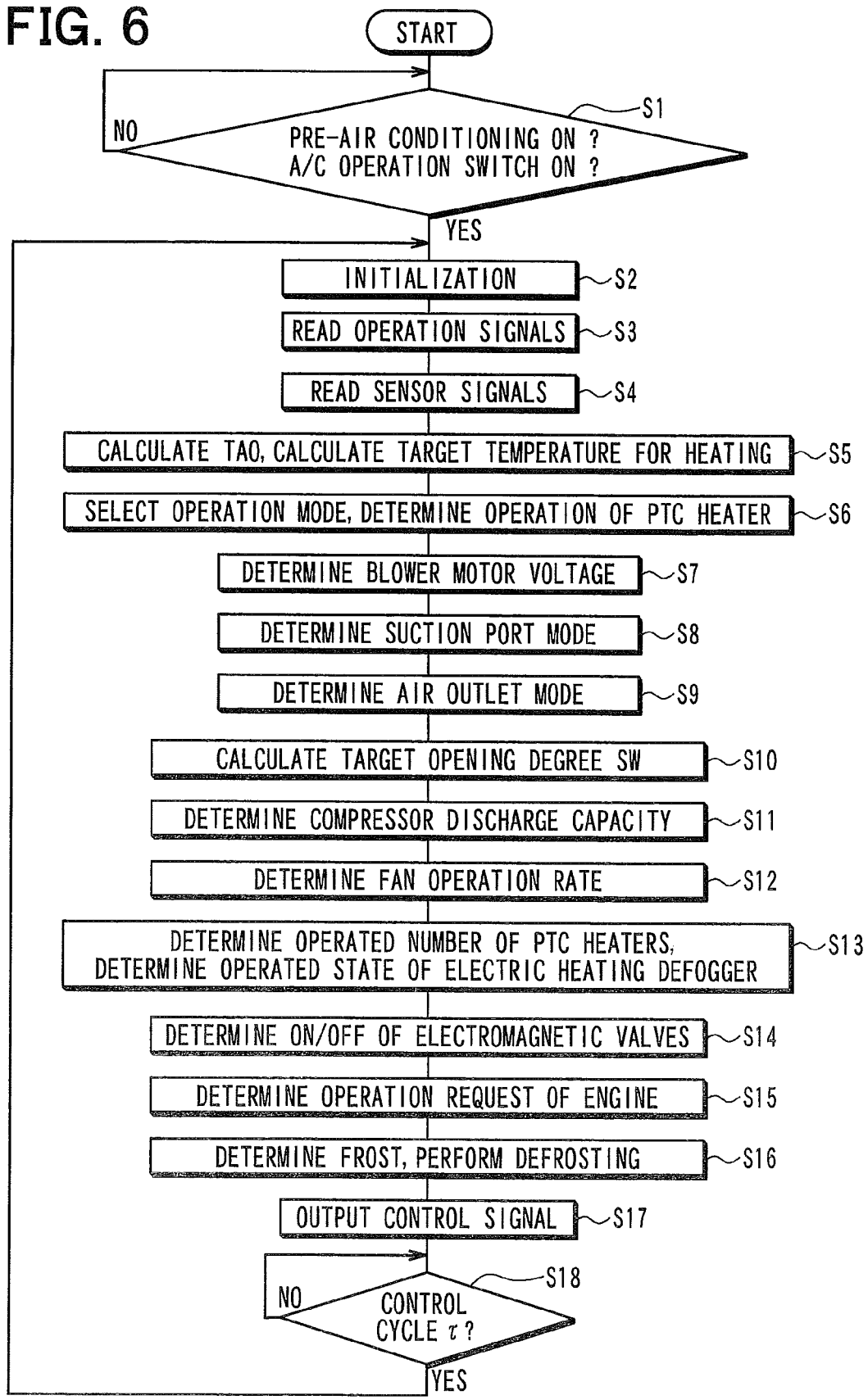
FIG. 6 is a flowchart showing control performed by the air conditioner for a vehicle in the first embodiment.

Next, the operation of the present embodiment with the above-mentioned arrangement will be described below with reference to FIG. 6. FIG. 6 is a flowchart showing control processing performed by the air conditioner 1 for a vehicle in the present embodiment. The control processing is performed by the supply of power from a battery to the air conditioning controller 50 even when a vehicle system is stopped.

First, in step S1, it is determined whether or not a start switch for pre-air conditioning, or an operation switch for the air conditioner 1 for a vehicle on the operation panel 60 is turned on (ON). When the start switch for the pre-air conditioning or the operation switch for the air conditioner for a vehicle is turned on, the operation proceeds to step S2.

The pre-air conditioning is the control of air conditioning, which starts air conditioning in the vehicle compartment before the passenger rides on the vehicle. The start switch for the pre-air conditioning is provided in a wireless terminal (i.e., remote controller) carried by the passenger. Thus, the passenger can initiate the air conditioner 1 for a vehicle from a location away from the vehicle.

Further, the hybrid car to which the air conditioner 1 for a vehicle of the present embodiment is applied can supply power from a commercial power source (i.e., external power source) to a batter thereby to charge the battery. When the vehicle is connected to the external power source, the pre-air conditioning is performed only for a predetermined time (for example, 30 minutes). In contrast, when the vehicle is not connected to the external power source, the pre-air conditioning is performed until a remaining battery level becomes a predetermined value or less.

In step S2, a flag, a timer, a control variable, and the like are initialized (initialization). And, initial alignment of a stepping motor included in the above electric actuator and the like is performed.

In next step S3, an operation signal is read from the operation panel 60, and then the operation proceeds to step S4. Specifically, the operation signals include a vehicle interior preset temperature Tset set by a vehicle interior temperature setting switch, a selection signal of the air outlet mode, a selection signal of the suction port mode, a setting signal of the amount of air from the blower 32, and the like.

In step S4, signals regarding the circumstances of the vehicle used for the air conditioning control, that is, detection signals from the above group of sensors 51 to 57 are read, and then the operation proceeds to step S5. In step S5, a target outlet air temperature TAO of blown air into the vehicle compartment is calculated. Further, in the heating mode, a target heat-exchanger temperature for heating is calculated. The target outlet air temperature TAO is calculated by the following equation F1:

$$TAO = Kset \times Tset - Kr \times Tr - Kam \times Tam - Ks \times Ts + C \quad (F1)$$

where Tset is a vehicle interior preset temperature set by the vehicle interior temperature setting switch, Tr is an inside air temperature detected by the inside air sensor 51, Tam is an outside air temperature detected by the outside air sensor 52, and Ts is an amount of solar radiation detected by the solar radiation sensor 53. The Kset, Kr, Kam, and Ks are control gains, and C is a constant for correction.

The target heat exchanger temperature for heating is a value basically calculated by the above formula F1. In some cases, the target temperature is often corrected to be set to a value lower than the TAO calculated by the formula F1 so as to restrict the power consumption.

In the subsequent steps S6 to S16, control states of various devices coupled to the air conditioning controller 50 are determined. In step S6, one mode is selected from among the cooling mode, the heating mode, the first dehumidification mode, and the second dehumidification mode, and the presence or absence of energization of the PTC heater 37 is determined, based on the air conditioning environmental state. The details of step S6 will be described later.

In step S7 of FIG. 6, the target air amount of air blown by the blower 32 is determined. Specifically, a blower motor voltage to be applied to the electric motor is determined with reference to a control map previously stored in the air conditioning controller 50 based on the TAO determined in step S4.

In more detail, in the present embodiment, the blower motor voltage is set to a high voltage near the maximum value thereof in an extreme-low temperature range (i.e., maximum cooling range) and an extreme-high temperature range (i.e., maximum heating range) of the TAO, so that the amount of air from the blower 32 is controlled to a level near the maximum amount thereof. As the TAO increases from the extreme-low temperature range toward the intermediate temperature range, the blower motor voltage is decreased with increasing range, thereby resulting in a decrease in the amount of air from the blower 32.

Further, as the TAO decreases from the extreme-high temperature range to the intermediate temperature range, the blower motor voltage is decreased based on a decrease of TAO, resulting in a decrease in the amount of air from the blower 32. When the TAO is positioned within a predetermined intermediate temperature range, the blower motor voltage is minimized, and thus the amount of air from the blower 32 is also minimized.

In step S8, a suction port mode, that is, a switching state of the inside/outside air switching box is determined. The suction port mode is also determined based on the TAO with reference to a control map previously stored in the air conditioning controller 50. The present embodiment basically gives higher priority on the outside air mode for introducing the outside air, but selects the inside air mode for introducing the inside air when the TAO exists in the extreme-low temperature range and a high cooling capacity is required to be obtained. Exhaust gas concentration detection means is provided for detecting an exhaust gas concentration of the outside air. When an exhaust gas concentration is equal to or more than a predetermined reference concentration, the inside air mode may be selected.

In step S9, an air outlet mode is determined. The air outlet mode is also determined based on the TAO with reference to a control map previously stored in the air conditioning controller 50. In the present embodiment, as the TAO increases from the low temperature range to the high temperature range, the air outlet mode is switched in turn from the foot mode to the bi-level mode, and then to the face mode.

Thus, the face mode is mainly selected in summer, the bi-level mode is mainly selected in both spring and autumn, and the foot mode is mainly selected in winter. When the possibility of fogging of the windowpane is determined to be high based on a relative humidity RHW of the surface of the windowpane detected by the humidity sensor or the like, the foot/defroster mode or defroster mode may be selected.

In step S10, a target opening degree SW of the air mix door 38 is calculated based on the TAO, an evaporator blown-air temperature Te of the air from the indoor evaporator 26 detected by the evaporator temperature sensor 56, and a heater temperature.

The heater temperature is a value determined based on the heating capacity of heating means (e.g., heater core 36, indoor condenser 12, and PTC heater 37) disposed in a heating air passage 33. An engine coolant temperature Tw can be generally used as the heater temperature. Thus, the target opening degree SW can be calculated by the following formula F2:

$$SW = [(TAO - Te)/(Tw - Te)] \times 100(\%) \quad (F2)$$

The case of SW=0(%) indicates the maximum cooling position of the air mix door 38 in which the cool air bypass passage 34 is fully opened, and the heating air passage 33 is completely closed. In contrast, the case of SW=100% indicates the maximum heating position of the air mix door 38 in which the cool air bypass passage 34 is completely closed, and the heating air passage 33 is fully opened.

In step S11, a refrigerant discharge capacity (specifically, the number of revolutions) of the compressor 11 is determined. The way to determine the basic number of revolutions of the compressor 11 will be described below. For example, in the cooling mode, a target evaporator blown-air temperature TEO of the evaporator blown-air temperature Te of the air from the indoor evaporator 26 is determined based on the TAO or the like determined in step S4 with reference to the control map previously stored by the air conditioning controller 50.

A deviation En (TEO−Te) between the target evaporator blown-air temperature TEO and the evaporator blown-air temperature Te is calculated. The deviation En−1 previously calculated is subtracted from the deviation En currently calculated thereby to determine the rate of change in deviation Edot (En−(En−1)). Such deviation En and deviation change rate Edot are used to determine an amount of change in number of revolutions ΔfC of the compressor with respect to the previous number of revolutions fCn−1 of the compressor according to fuzzy inference based on a membership function and rule previously stored by the air conditioning controller 50. Then, the present number of revolutions fCn of the compressor is calculated by adding the amount of change in number of revolutions ΔfC of the compressor with respect to the previous number of revolutions fCn−1 of the compressor.

In the heating mode, a target high pressure PDO of a discharge side refrigerant pressure (high-pressure side refrigerant pressure) Pd is determined based on the target heat exchanger temperature for heating or the like determined in step S4 with reference to a control map previously stored in the air conditioning controller 50. A deviation Pn (PDO−Pd) between the target high pressure PDO and the discharge side refrigerant pressure Pd is calculated. The use of the deviation Pn and a rate of change in deviation Pdot (Pn−(Pn−1)) with reference to the deviation Pn−1 previously calculated determines an amount of change in number of revolutions ΔfH with respect to the previous number of revolutions fHn−1 of the compressor based on the fuzzy inference. Then, the present number of revolutions fHn of the compressor is calculated by adding the amount of change in number of revolutions ΔfH of the compressor with respect to the previous number of revolutions fHn−1 of the compressor.

In step S12 shown in FIG. 6, an operating ratio (e.g., number of revolutions) of the blower fan 16*a* for blowing outside air toward the outdoor heat exchanger 16 is determined in step S12 shown in FIG. 6. A determination method of the operating ratio of the basic blower fan 16*a* of the present embodiment is as follows. That is, a first temporary operating ratio of the blower fan 16*a* is determined in such a manner that the operating ratio of the blower fan 16*a* increases in accordance with an increase of the discharge refrigerant temperature Td of the compressor 11. A second temporary operating ratio of the blower fan 16*a* is determined in such a manner that the operating ratio of the blower fan 16*a* increases in accordance with an increase of the engine coolant temperature Tw.

A larger one of the first and second temporary operating ratios (numbers of revolutions) is selected. The selected operating ratio is corrected taking into consideration reduction of noise of the solar fan 16*a* and vehicle speed, and the corrected value is determined as the operating ratio of the blower fan 16*a*.

In step S13, the number of the operated PTC heaters 37 is determined, and the operated state of the electric heating defogger 47 is also determined. For example, in some cases, the target heat exchanger temperature for heating cannot be obtained even at the target opening degree SW of the air mix door 38 of 100% in the heating mode when the energization of the PTC heaters 37 is determined to be necessary in step S6.

In such cases, the number of the operated PTC heaters 37 may as well be determined based on a difference between the inside air temperature Tr and the target heat exchanger temperature for heating.

When there is high possibility of formation of fogging on the windowpane due to the humidity and temperature of the interior of the vehicle, or when fogging occurs on the windowpane, the electric heating defogger 47 is operated.

Then, in step S14, the operated states of the respective electromagnetic valves 13, 17, 20, 21, 24 serving as refrigerant circuit switching means are determined based on the operating mode determined in the above step S6. At this time, the present embodiment achieves the refrigerant circuit according to the operation mode. Some electromagnetic valves are controlled to open the refrigerant flow paths through which refrigerant flows, and the other electromagnetic valves are brought into a non-energization state for the refrigerant flow paths through which refrigerant does not flow, depending on the level of the refrigerant pressure, thereby reducing power consumption.

The details of the process in step S14 will be described below using the flowchart of FIG. 7. First, in step S14*a*, the operating mode determined in step S6 is read into a memory CYCLE_VALVE. Then, in step S14*b*, it is determined whether the air conditioner 1 for a vehicle is stopped or not, that is, whether air conditioning in the vehicle interior is performed or not.

When the air conditioner 1 for a vehicle is determined to be stopped in step S14*b*, the memory CYCLE_VALVE is set in the cooling mode (COOL cycle) in step S14*c*. Then, the operation proceeds to step S14*d*. When the air conditioning 1 for a vehicle is determined not to be stopped in step S14*b*, the operation proceeds to step S14*d*.

The phrase "air conditioner 1 for a vehicle is stopped" which is determined in step S14*b* means not only that the operation switch for the air conditioner 1 for a vehicle on the operation panel 60 is turned OFF, but also that the amount of air from the blower 32 is set to 0 by an air amount setting switch on the operation panel 60, that is, that the vehicle system itself is stopped.

In step S14*d*, the operated states of the respective electromagnetic valves 13, 17, 20, 21, 24 are determined. Specifically, when the memory CYCLE_VALVE is set in the cooling mode (COOL cycle), all electromagnetic valves are brought into the non-conductive state. When the memory CYCLE_VALVE is set to the heating mode (HOT cycle), the electric three-way valve 13, the high-pressure electromagnetic valve 20, and the low-pressure electromagnetic valve 17 are brought into the energization state, and the remaining electromagnetic valves 21 and 24 are brought into the non-energization state. When the memory CYCLE_VALVE is set to the first dehumidification mode (DRY_EVA cycle), the electric three-way valve 13, the low-pressure electromagnetic valve 17, the dehumidification electromagnetic valve 24, and the heat exchanger interruption electromagnetic valve 21 are brought into the energization state, and the high-pressure electromagnetic valve 20 is brought into the non-energization state. When the memory CYCLE_VALVE is set to the second dehumidification mode (DRY_ALL cycle), the electric three-way valve 13, the low-pressure electromagnetic valve 17, and the dehumidification electromagnetic valve 24 are brought into the energization state, and the remaining electromagnetic valves 20 and 21 are brought into the non-energization state.

That is, in the present embodiment, even when switching to the refrigerant circuit of any one of the operating modes, the supply of power to at least one of the electromagnetic valves 13, 17, 20, 21, 24 is stopped.

In step S15, the presence or absence of an operation request of the engine EG is determined. Since a general vehicle designed to obtain a driving force for vehicle traveling only from the engine EG constantly operates the engine, the engine coolant is constantly at high temperature. Thus, a general air conditioner for the vehicle can exhibit the sufficient heating capacity by allowing the engine coolant to flow through the heater core 36.

In contrast, the hybrid car, such as that to which the embodiment of the invention is applied, can travel by the driving force for traveling obtained only from the electric motor for traveling as long as the remaining battery level is sufficient. Thus, when the engine EG is stopped, the temperature of the engine coolant is increased only up to about 40° C. if the high heating capacity is required. Therefore, the heater core 36 cannot exhibit sufficient heating capacity.

In the present embodiment, in order to ensure the heat source required for the heating by using the heater core 36, a request signal for activating the engine EG is output from the air conditioning controller 50 to an engine controller (not shown) to be used for control of the engine EG at the engine coolant temperature Tw lower than a predetermined reference coolant temperature even when the high heating capacity is required.

Thus, the engine coolant temperature Tw is increased thereby to provide the high heating capacity. Such an operation request signal of the engine EG causes the engine EG to be activated even when the engine EG does not need to be operated as a driving source for the vehicle traveling, thereby deteriorating the fuel efficiency of the vehicle. Thus, it is desirable that a frequency of outputting the operation request signal for the engine EG is reduced as much as possible.

In step S16, it is determined whether frost is generated on the outdoor heat exchanger 16. When frost is formed at the outdoor heat exchanger 16, the control of defrosting the outdoor heat exchanger 16 is performed.

When the outdoor heat exchanger 16 absorbs heat from the refrigerant, as in the refrigerant circuit in the heating mode, the refrigerant evaporation temperature at the outdoor heat exchanger 16 is decreased down to about −12° C., thereby generating frost at the outdoor heat exchanger 16. Such formation of frost makes it difficult for the air outside the vehicle compartment to flow through the outdoor heat exchanger 16, so that the outdoor heat exchanger 16 cannot exchange heat between the refrigerant and the air outside the vehicle compartment.

Thus, when frost is formed at the outdoor heat exchanger 16, a defrosting mode is set at step S16, so that a defrosting control of forcedly bringing the refrigerant circuit into the cooling mode is performed. Since the high-pressure refrigerant dissipates heat at the outdoor heat exchanger 16 as described later in the refrigerant circuit of the cooling mode, the frost formed at the outdoor heat exchanger 16 can be melted at the refrigerant circuit in the cooling mode. A detail control of step S16 of the present embodiment will be described later.

In step S17, control signals and control voltages determined at steps S6 to S16 are output by the air conditioning controller 50 to various types of components 61, 13, 17, 20, 21, 24, 16*a*, 32, 62, 63, and 64. For example, a control signal is output to an inverter 61 for the electric motor 11*b* of the compressor 11 such that the number of revolutions of the compressor 11 becomes the number of revolutions determined in step S11.

In step S18 shown in FIG. 6, the operation is held during a control cycle τ. When the control cycle τ is determined to elapse, the operation returns to step S3. In the present embodiment, the control cycle τ is set to 250 ms. This is because the air conditioning controllability of the vehicle interior is not adversely affected even due to a long control cycle as compared to the engine control or the like. Further, the volume of communication for the air conditioning control in the vehicle interior is restricted, and thus the volume of communication in a control system which needs to perform the high-speed control can be sufficiently ensured, as in the engine control or the like.

Next, the control process in step S16 will be described in detail.

Figure 9:
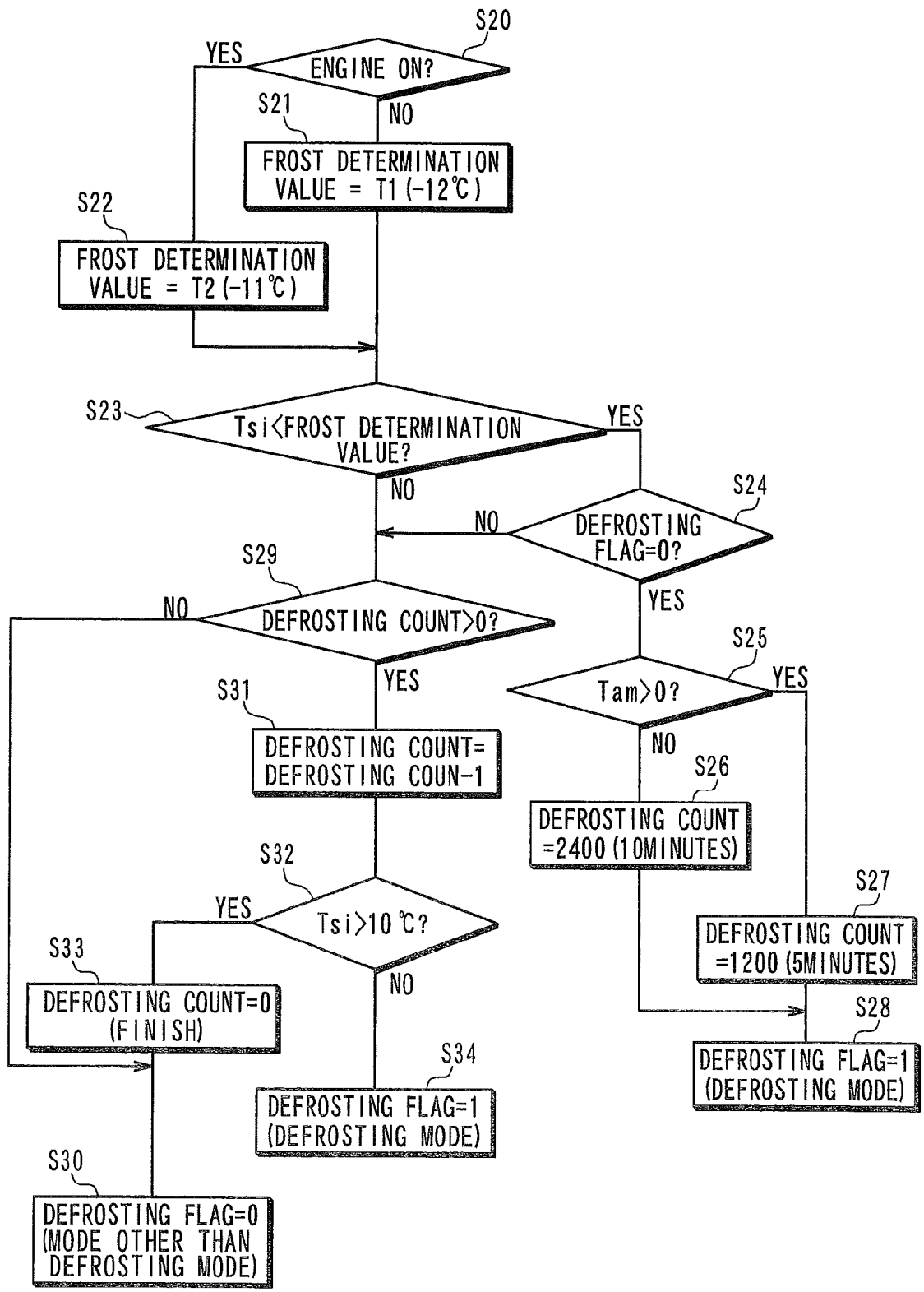
FIG. 9 is a flowchart showing a part of the control performed by the air conditioner for a vehicle in the first embodiment.

FIG. 9 is a flowchart showing a part of the frost determination control in step S16 of FIG. 6. As shown in FIG. 9, in step S20, it is determined whether or not the engine EG is in operating (i.e., engine EG ON). When it is determined that the engine EG is stopped in step S20, a frost determination value is set at a first reference temperature T1 (e.g., −12° C.) in step S21. In contrast, when it is determined that the engine EG is in operating in step S20, the frost determination value is set at a second reference temperature T2 (e.g., −11° C.) that is higher than the first reference temperature T1 of step S21. That is, the frost determination value to be used in step S23 is different between when the engine EG is stopped and when the engine EG is operating.

Next, in step S23, it is determined whether or not the outdoor heat exchanger 16 is frosted In the present embodiment, a temperature of refrigerant having passed through the outdoor heat exchanger 16 in the heating mode is detected by the suction temperature sensor 57, and it is determined whether or not the refrigerant suction temperature Tsi detected by the suction temperature sensor 57 is lower than the frost determination value.

When the refrigerant suction temperature Tsi detected by the suction temperature sensor 57 is lower than the frost determination value in step S23, it is determined frost is formed at the outdoor heat exchanger 16, and control program moves to step S24. For example, in the present embodiment, it is determined whether or not a defrosting flag is zero in step S24. When it is determined that the defrosting flag is zero in step S24, steps 25 to S27 are performed, and then the defrosting flag is set at 1 so that the defrosting mode is set in step S28.

In the present embodiment, in steps S20 to S22, the frost determination value to be used in the frost determination at step S23 is set higher when the engine EG is operated, as compared to the frost determination value when the engine EG is stopped. Therefore, the defrosting mode can be easily set when the engine EG is operated, as compared with a case where the engine EG is stopped. For example, in a case where the vehicle is traveling at a high speed and is difficult to be driven by a battery, or in a case where a battery remaining degree is small, the engine EG is generally operated as a driving source for the vehicle traveling. Thus, in this case, the defrosting mode can be easily set.

At steps S25 to S27, a timer for performing the defrosting operation is set in accordance with an outside air temperature Tam. For example, in step S25, it is determined whether or not the outside air temperature Tam is higher than 0° C. When outside air temperature is lower than 0° C. in step S25, the defrosting count which is the time of defrosting control is set at a first predetermined time, for example, 2400 (10 minutes) in step S26. When outside air temperature is higher than 0° C. in step S25, the defrosting count which is the time of defrosting control is set at a second predetermined time, for example, 1200 (5 minutes). That is, when the outside air temperature is higher than 0° C., the defrosting count is set at the second predetermined time that is shorter than the first predetermined time.

In contrast, when the refrigerant suction temperature Tsi detected by the suction temperature sensor 57 is not lower than the frost determination value in step S23, control program moves to step S29. Furthermore, even when the refrigerant suction temperature Tsi detected by the suction temperature sensor 57 is lower than the frost determination value in step S23, when the controller 50 determines that the defrosting flag is 1 in step S24, the control program moves to step S29.

Then, in step S29, it is determined whether the defrosting count is larger than zero, that is, it is determined whether the defrosting count is now performed. When the refrigerant suction temperature Tsi is not lower than the frost determination value in step S23, and when the defrosting mode is not set, the defrosting count is not determined in the determination of step S29, and the control program moves to step S30. That is, in a case where the refrigerant suction temperature Tsi is higher than the frost determination value, when the defrosting mode is not set, it is determined that the outdoor heat exchanger 16 is not frosted, and the defrosting flag is maintained at zero so that a mode other than the defrosting mode is set at step S30.

In contrast, in a case where the refrigerant suction temperature Tsi is not lower than the frost determination value in step S23, when the defrosting mode is set (defrosting flag=1), the determination of step S29 is YES, and the control program moves to step S31. In step S31, the defrosting count is reduced by 1, and control program moves to step S32.

Then, in step S32, it is determined whether or not the refrigerant suction temperature Tsi is higher than a predetermined temperature (e.g., 10° C.). When the refrigerant suction temperature Tsi detected by the suction temperature sensor 57 is higher than the predetermined temperature (e.g., 10° C.) in step S32, it is determined the defrosting is finished, and the defrosting count is set at zero in step S33. Then, defrosting control is ended by setting the defrosting flag at 0 in step S30.

In contrast, when the refrigerant suction temperature Tsi detected by the suction temperature sensor 57 is equal to or lower than the predetermined temperature (e.g., 10° C.) in step S32, it is estimated that the defrosting is not finished. In this case, the defrosting flag is set at 1 in step S34, so that the defrosting mode is continuously performed.

As shown in FIG. 6, the frost determination result determined in step S16 is reflected to the control process of step S3 and steps thereafter, after steps S17 and S18 are performed. Thus, the frost determination result determined in step S16 is reflected to the cycle selection and the PTC heater selection in step S6.

Next, the control process in step S6 will be described in detail with reference to FIG. 10.

Figure 10:
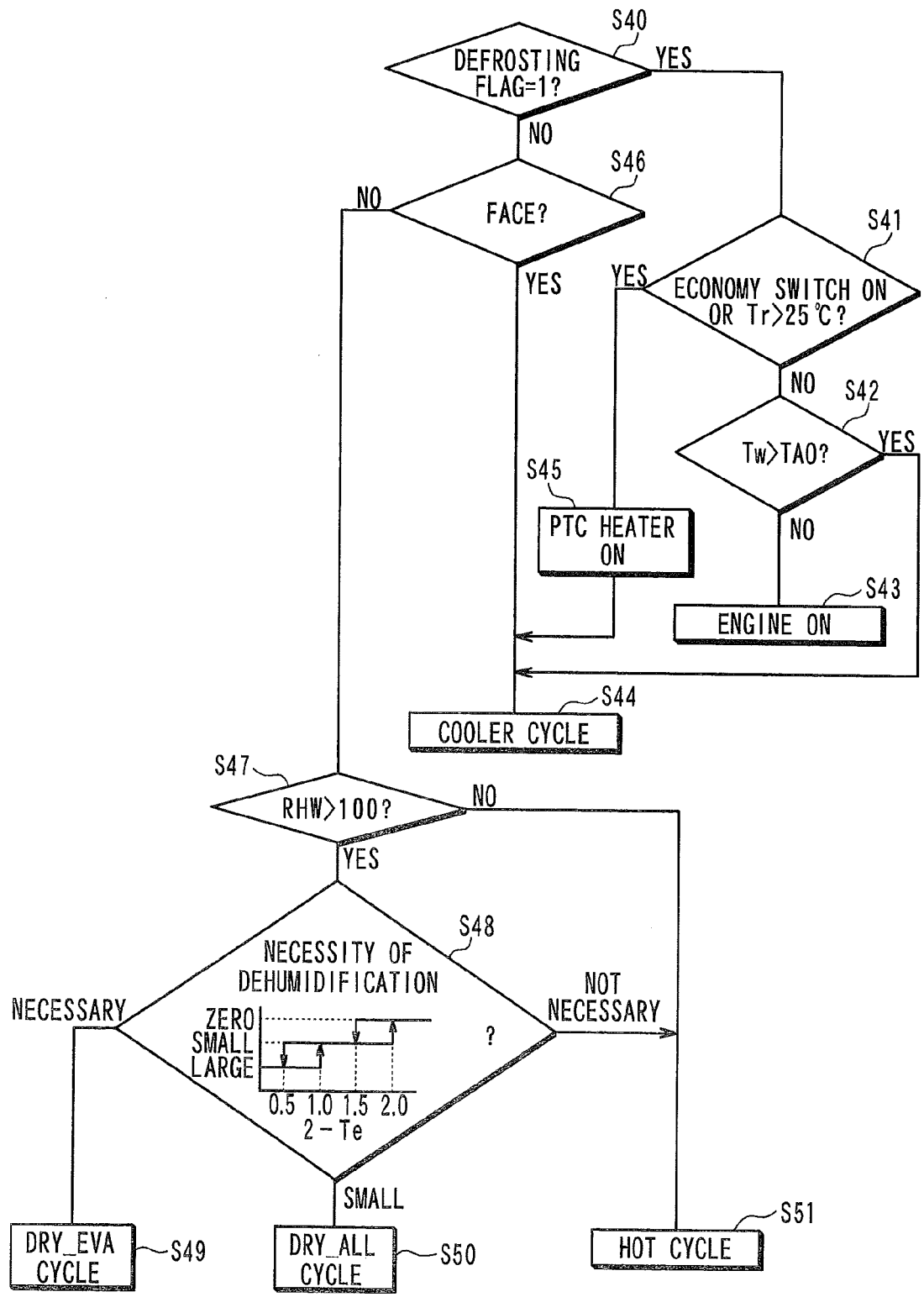
FIG. 10 is a flowchart showing a part of the control performed by the air conditioner for a vehicle in the first embodiment.

FIG. 10 is a flowchart showing a part of the control in step S6 of FIG. 6. In Step S6, it is first determined at step S40 whether the defrosting flag is 1, i.e., whether the defrosting mode is set.

When the defrosting flag is 1 in step S40, the control program moves to step S41 so that a condition for performing a defrosting control is set.

Then, in step S41, it is determined whether or not the economy switch 60d is turned on by a passenger, or whether or not the room temperature Tr (e.g., inside air temperature) of the vehicle compartment is higher than a predetermined temperature (e.g., 25° C.).

That is, in step S41, it is determined whether an economy mode is set by the economy switch 60d, or whether it is necessary to set a large heating capability. When the economy mode is set, the refrigeration cycle 10 is operated with the priority of a power saving. At this time, when the economy switch 60s is turned off so that the economy mode is not set, and when the room temperature Tr is lower than 25° C., control program moves to step S42 so as to select the heater core 36 as the heating means for heating the vehicle compartment. The heater core 35 heats air to be blown into the vehicle compartment by using engine coolant as a heat source.

Then, in step S42, it is determined whether or not the engine coolant temperature Tw is higher than the target outlet air temperature TAO. When the coolant temperature Tw is lower than the TAO while the engine EG is stopped, it is impossible to heat air to have a temperature corresponding to the TAO by using the engine coolant as the heat source. Thus, in this case, the engine EG is turned on so as to be operated in step S43.

As a result, when the engine EG is stopped, an engine ON request signal for operating the engine EG is output to the engine controller from the air conditioning controller 50, so that the engine EG is operated, thereby increasing the temperature of the engine coolant.

While the control process of step S2 to S18 is repeated, the determination of step S42 is performed. Thus, when the temperature of the engine coolant is increased to be higher than the TAO in step S42, the control at step S44 is performed.

When the coolant temperature Tw is higher than the TAO, it is possible to heat air to have a temperature corresponding to the TAO by using the engine coolant as the heat source. Thus, in step S44, the cooler cycle (cooling mode) is set as the operation mode of the refrigeration cycle 10, thereby defrosting the outdoor heat exchanger 16. As a result, the temperature of the outdoor heat exchanger 16 rises and defrosting is performed in the outdoor heat exchanger 16.

In the heat pump cycle, frost may be formed on the outdoor heat exchanger 16. Thus, when the defrosting flag is determined to be 1 in step S40, the operation mode of the refrigeration cycle 10 is the heat pump cycle.

In the present embodiment, even when the defrosting mode is set, the heat pump cycle is continuously operated until the coolant temperature Tw is higher than the TAO in step S42. Then, when the coolant temperature Tw becomes higher than the TAO, the operation mode of the refrigeration cycle 10 is switched from the heat pump cycle to the cooler cycle in step S44.

The determination of step S42 is performed regardless of a case where the engine EG is operated or a case where the engine EG is stopped. For example, even when the engine EG is stopped, at a time immediately after the stop of the engine EG, the temperature of the engine coolant becomes higher than the TAO. In this case, a request for operating the engine EG is not output, and the cooler cycle is selected in step S44.

When the economy switch 60d is turned on or/and when the room temperature Tr is higher than the predetermined temperature (e.g., 25° C.), the control program moves to step S45. Then, in step S45, the operation (engine ON) of the engine EG is not selected, but the operation (PTC heater ON) of the PTC heater 37 is selected. Next, in step S44, the cooler cycle is selected as the operation mode of the refrigeration cycle 10, in order to perform the defrosting of the outdoor heat exchanger 16.

As a result, a control signal is output to the PTC heaters 37 in step S17 of FIG. 6, so that air to be blown into the vehicle compartment is heated by the PTC heater 37. Therefore, defrosting of the outdoor heat exchanger 16 can be performed by using the cooler cycle, while the heating of the vehicle compartment can be performed with the PTC heater 37.

When the defrosting flag is not 1 in step S40, the control program moves to step S46, and a general cycle for an operation mode other than the defrosting mode is set in the refrigeration cycle 10.

In step S46, it is determined whether the automatic air outlet mode is the face mode. This is for determining the necessity for the heating of the vehicle compartment.

When the air outlet mode is the face mode in step S46, it is determined that the heating of the vehicle compartment is unnecessary, and thereby the cooling mode (cooler cycle) is selected as the operation mode of the refrigeration cycle 10 in step S44. When the air outlet mode is not the face mode in step S46, it is determined that the heating of the vehicle compartment is necessary, and thereby one of the HOT cycle (heating mode), the DRY_EVA cycle (first dehumidification mode) and the DRY_ALL cycle (second dehumidification mode) is selected based on a necessity of dehumidification.

The air outlet mode is determined based on the TAO in step S9 of FIG. 6. Thus, when the determination in step S46 is performed for the first time, the air outlet mode is not determined yet in the automatic control. When the determination in step S46 is first intended to be performed, step S46 and the following steps (specifically, steps S46, S44, and S47 to S51) are omitted, or the determination process of the step S46 or the like is executed in a temporary air outlet mode (initialization of the air outlet mode).

In step S47, it is determined whether or not there is a possibility of fogging of the windowpane based on the relative humidity RHW of the surface of the windowpane. In the present embodiment, it is determined whether or not the RHW is higher than a predetermined value (e.g., 100). When the RHW is higher than 100 (if YES), it is determined that there is a possibility of fogging the windowpane, and then the operation proceeds to S48.

In step S48, the degree of need (necessity) of the dehumidification is determined based on the evaporator blown-air temperature Te. Based on the determination result of step S48, one mode is selected from among the heating mode, first dehumidification mode, and second dehumidification mode in any one of steps S49 to S51.

Specifically, when the evaporator blown-air temperature Te is high, the dehumidification is determined to be necessary. When the necessity of the dehumidification is determined to be large, the DRY_EVA cycle (first dehumidification mode) with the high dehumidification capacity is selected in step S49. When the evaporator blown-air temperature Te is low, the dehumidification is determined to be unnecessary, and then the HOT cycle (heating mode) without the dehumidification capacity with the high heating capacity is selected in step S51. When the evaporator blown-air temperature Te is moderate, the necessity of dehumidification is determined to be small, and then the DRY_ALL cycle with the small dehumidification capacity (second dehumidification mode) is selected in step S50.

In the present embodiment, the degree of need of dehumidification is determined based on the evaporator blown-air temperature Te and the map shown in step S48 of FIG. 10. The operating mode is selected using the map, so that the temperature of the indoor evaporator 26 is controlled to about 2° C.

On the other hand, when the RHW is determined to be equal to or less than 100 in step S47 (if NO), it is determined that there is no possibility of fogging of the windowpane. Then, the operation proceeds to step S51 where the HOT cycle (heating mode) without the dehumidification capacity with the high heating capacity is selected.

The air conditioner 1 for a vehicle of the present embodiment is controlled as mentioned above, and is operated based on the operating mode selected in the control step S6 in the following way.

(a) Cooling Mode (COOL Cycle: see FIG. 1)

In the cooling mode (cooler cycle), the air conditioning controller 50 sets all electromagnetic valves in the non-energization state. Thus, the electric three-way valve 13 connects the refrigerant outlet side of the indoor condenser 12 to one of the refrigerant inlet and outlet ports of the first three-way joint 15, so that the low-pressure electromagnetic valve 17 is closed, the high-pressure electromagnetic valve 20 is opened, the heat exchanger interruption electromagnetic valve 21 is opened, and the dehumidification electromagnetic valve 24 is closed.

Thus, as illustrated by the arrows in FIG. 1, the vapor compression refrigeration cycle is constructed in which refrigerant circulates through the compressor 11, the indoor condenser 12, the electric three-way valve 13, the first three-way joint 15, the outdoor heat exchanger 16, the second three-way joint 19, the high-pressure electromagnetic valve 20, the second check valve 22, the variable throttle mechanism 27b of the thermal expansion valve 27, the fourth three-way joint 25, the indoor evaporator 26, the temperature sensing portion 27a of the thermal expansion valve 27, the fifth three-way joint 28, the accumulator 29, and the compressor 11 in that order.

In the refrigerant circuit in the cooling mode, the refrigerant flowing from the electric three-way valve 13 to the first three-way joint 15 does not flow out to the low-pressure electromagnetic valve 17 side because the low-pressure electromagnetic valve 17 is closed. The refrigerant flowing from the outdoor heat exchanger 16 into the second three-way joint 19 does not flow out to the heat exchanger interruption electromagnetic valve 21 because the dehumidification electromagnetic valve 24 is closed. The refrigerant flowing from the variable throttle mechanism 27b of the thermal expansion valve 27 does not flow out to the dehumidification electromagnetic valve 24 side because the valve 24 is closed. The refrigerant flowing from the temperature sensing portion 27a of the thermal expansion valve 27 into the fifth three-way joint 28 does not flow out to the second check valve 22 by the action of the second check valve 22.

Thus, the refrigerant compressed by the compressor 11 is cooled by exchanging heat with the air (cool air) having passed through the indoor evaporator 26 in the indoor condenser 12. Further, the refrigerant is cooled by exchanging heat with the outside air in the outdoor evaporator 16, and then decompressed and expanded by the thermal expansion valve 27. The low-pressure refrigerant decompressed by the thermal expansion valve 27 flows into the indoor evaporator 26, and absorbs heat from the air blown from the blower 32, thus evaporating itself. Thus, the air passing through the indoor evaporator 26 is cooled.

At this time, since the opening degree of the air mix door 38 is adjusted as mentioned above, a part (or all) of the air cooled by the indoor evaporator 26 flows from the cool air bypass passage 34 to the mixing space 35. And, a part (or all) of the air cooled by the indoor evaporator 26 flows into the heating air passage 33, and is then heated again while passing through the heater core 36, the indoor condenser 12, and the PTC heater 37 to flow into the mixing space 35.

Thus, the airs are mixed in the mixing space 35 thereby to adjust the temperature of the air blown off into the vehicle interior to a desired temperature, so that the cooling operation can be performed in the vehicle compartment. In the cooling mode, the air conditioner has the higher dehumidification capacity of the air, but hardly exhibits the heating capacity.

The refrigerant flowing from the indoor evaporator 26 flows into the accumulator 29 via the temperature sensing portion 61a of the thermal expansion valve 27. The refrigerant is separated by the accumulator 29 into vapor and liquid phases, and the refrigerant in the vapor phase is sucked into and compressed again by the compressor 11.

Figure 2:
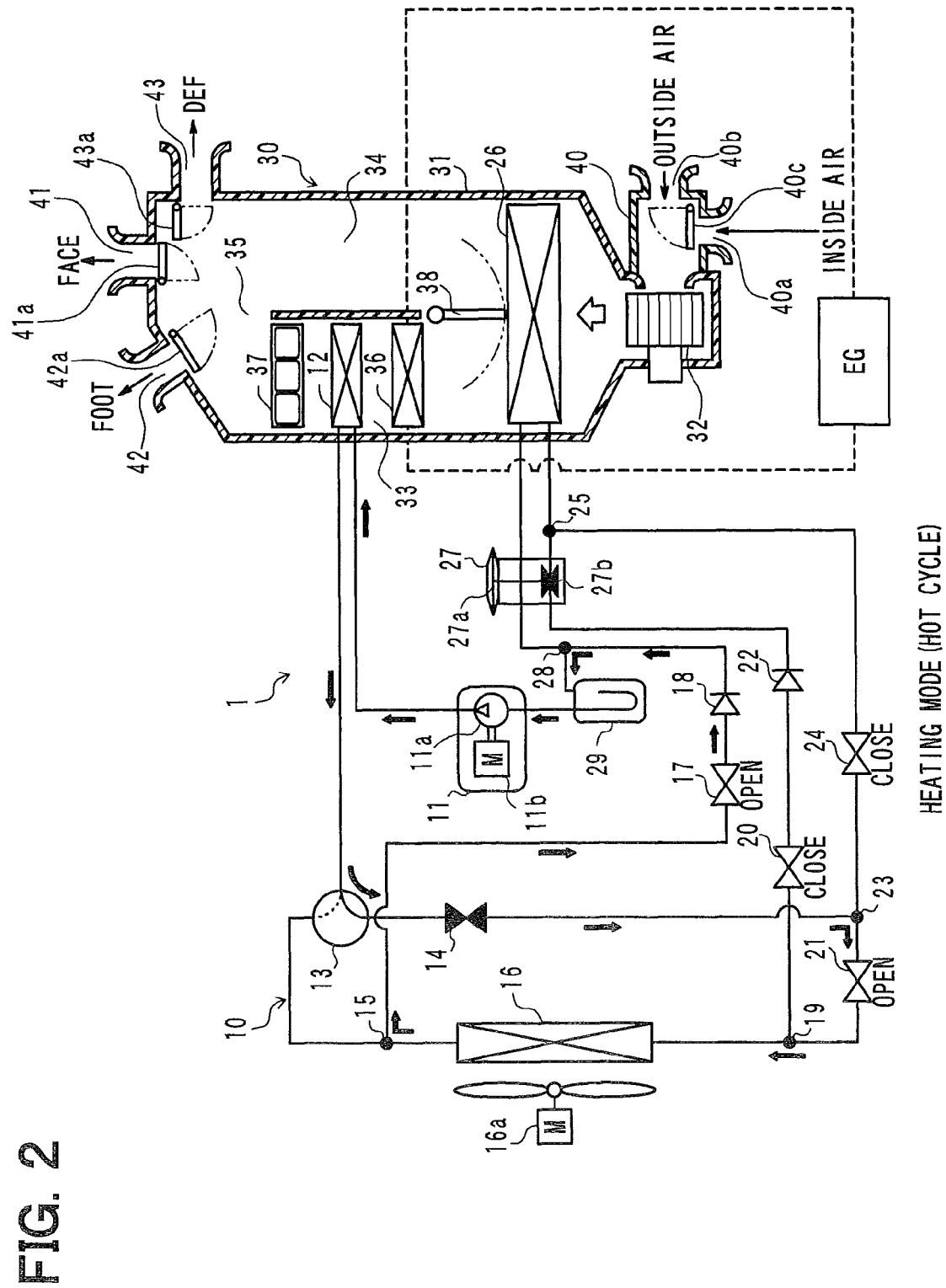
FIG. 2 is an entire configuration diagram showing the air conditioner for a vehicle with a refrigerant circuit in a heating mode according to the first embodiment.

(b) Heating Mode (HOT Cycle: see FIG. 2)

In the heating mode, the air conditioning controller 50 sets the electric three-way valve 13, the high-pressure electromagnetic valve 20, and the low-pressure electromagnetic valve 17 in the energization state, and other electromagnetic valves 21 and 24 in the non-energization state. Thus, the electric three-way valve 13 connects the refrigerant outlet side of the indoor condenser 12 to the refrigerant inlet side of the fixed throttle 14, so that the low-pressure electromagnetic valve 17 is opened, the high-pressure electromagnetic valve 20 is closed, the heat exchanger interruption electromagnetic valve 21 is opened, and the dehumidification electromagnetic valve 24 is closed.

Thus, as illustrated by the arrows in FIG. 2, the vapor compression refrigeration cycle is constructed in which refrigerant circulates through the compressor 11, the indoor condenser 12, the electric three-way valve 13, the fixed throttle 14, the third three-way joint 23, the heat exchanger interruption electromagnetic valve 21, the second three-way joint 19, the outdoor heat exchanger 16, the first three-way joint 15, the low-pressure electromagnetic valve 17, the first check valve 18, the fifth three-way joint 28, the accumulator 29, and the compressor 11 in that order.

In the refrigerant circuit in the heating mode, the refrigerant flowing from the fixed throttle 14 to the third three-way joint 23 does not flow out to the dehumidification electromagnetic valve 24 side because the valve 24 is closed. The refrigerant flowing from the heat exchanger interruption electromagnetic valve 21 into the second three-way joint 19 does not flow out to the high-pressure electromagnetic vale 20 because the valve 20 is closed. The refrigerant flowing from the outdoor heat exchanger 16 into the first three-way joint 15 does not flow out to the electric three-way valve 13 because the electric three-way valve 13 connects the refrigerant outlet side of the indoor condenser 12 to the refrigerant inlet side of the fixed throttle 14. The refrigerant flowing from the first check valve 18 into the fifth three-way joint 28 does not flow out to the thermal expansion valve 27 because the dehumidification electromagnetic valve 24 is closed.

The refrigerant compressed by the compressor 11 is cooled by exchanging heat with the air blown from the blower 32 in the indoor condenser 12. Thus, the air passing through the indoor condenser 12 is heated. At this time, the opening degree of the air mix door 38 is adjusted, so that the temperature of the air mixed in the mixing space 35 and blown into the vehicle interior is adjusted to a predetermined temperature, in the same way as in the cooling mode thereby to enable heating operation in the vehicle interior. In the heating mode, the air conditioner does not exhibit the dehumidification capacity of the air.

The refrigerant flowing from the indoor condenser 12 is decompressed by the fixed throttle 14 to flow into the outdoor heat exchanger 16. The refrigerant flowing into the outdoor heat exchanger 16 absorbs heat from air outside the vehicle compartment blown from the blower fan 16a to evaporate itself. The refrigerant flowing from the outdoor heat exchanger 16 flows into the accumulator 29 via the low-pressure electromagnetic valve 17, the first check valve 18, and the like. The refrigerant is separated by the accumulator 29 into vapor and liquid phases, and the refrigerant in the vapor phase is sucked into and compressed again by the compressor 11.

Figure 3:
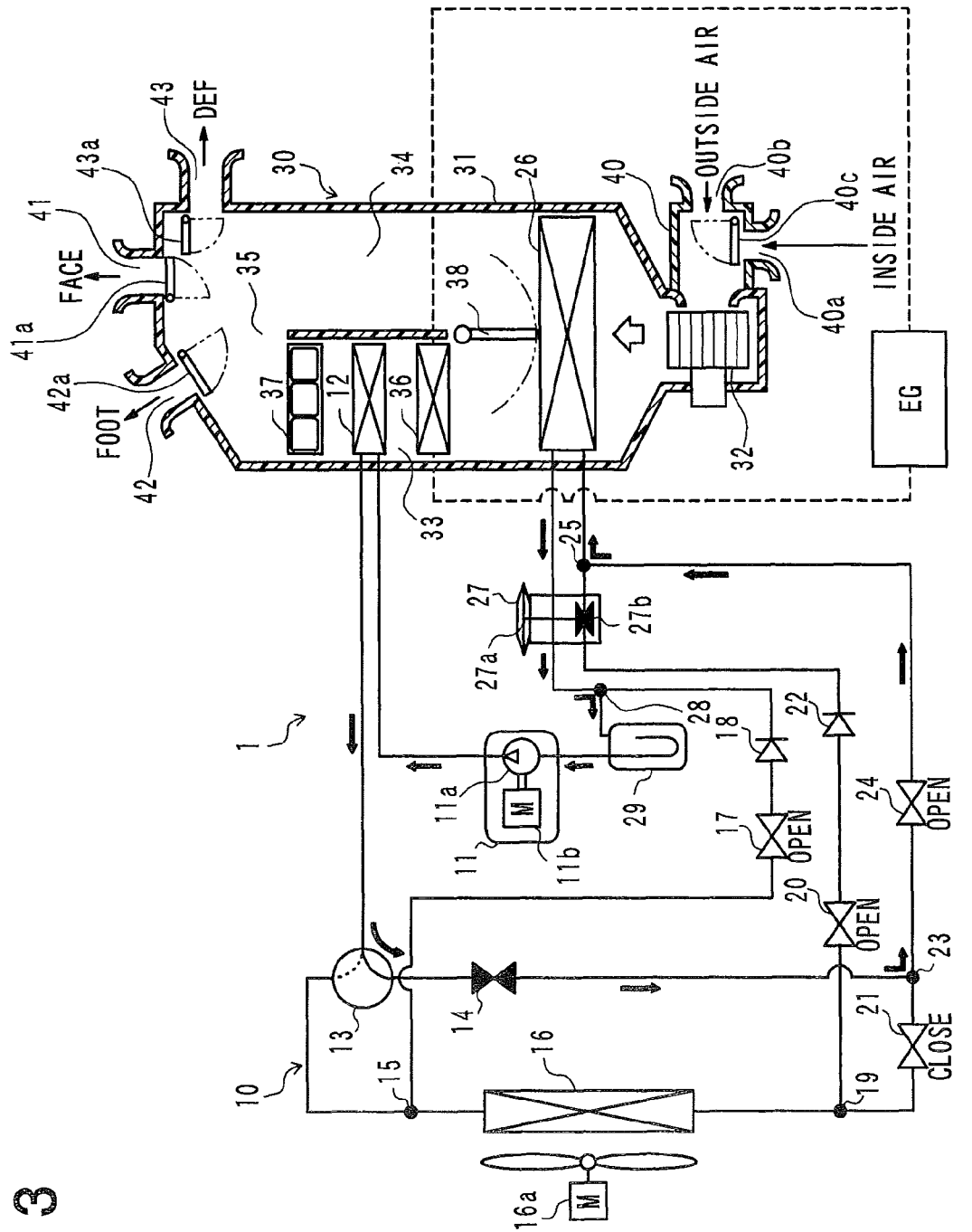
FIG. 3 is an entire configuration diagram showing the air conditioner for a vehicle with a refrigerant circuit in a first dehumidification mode according to the first embodiment.

(c) First Dehumidification Mode (DRY_EVA Cycle: see FIG. 3)

In the first dehumidification mode, the air conditioning controller 50 set the electric three-way valve 13, the low-pressure electromagnetic valve 17, the heat exchanger interruption electromagnetic valve 21, and the dehumidification electromagnetic valve 24 in the energization state, and the high-pressure electromagnetic valve 20 in the non-energization state. Thus, the electric three-way valve 13 connects the refrigerant outlet side of the indoor condenser 12 to the refrigerant inlet side of the fixed throttle 14, so that the low-pressure electromagnetic valve 17 is opened, the high-pressure electromagnetic valve 20 is opened, the heat exchanger interruption electromagnetic valve 21 is closed, and the dehumidification electromagnetic valve 24 is opened.

Thus, as illustrated by the arrows in FIG. 3, the vapor compression refrigeration cycle is constructed in which refrigerant circulates through the compressor 11, the indoor condenser 12, the electric three-way valve 13, the fixed throttle 14, the third three-way joint 23, the dehumidification electromagnetic valve 24, the fourth three-way joint 25, the indoor evaporator 26, the temperature sensing portion 27a of the thermal expansion valve 27, the fifth three-way joint 28, the accumulator 29, and the compressor 11 in that order.

In the refrigerant circuit in the first dehumidification mode, the refrigerant flowing from the fixed throttle 14 to the third three-way joint 23 does not flow out to the heat exchanger interruption electromagnetic valve 21 because the valve 21 is closed. The refrigerant flowing from the dehumidification electromagnetic valve 24 into the fourth three-way joint 25 does not flow out to the variable throttle mechanism 27b of the thermal expansion valve 27 by the action of the second check valve 22. The refrigerant flowing from the temperature sensing portion 27a of the thermal expansion valve 27 to the fifth three-way joint 28 does not flow out to the first check valve 18 by the action of the first check valve 18.

Thus, the refrigerant compressed by the compressor 11 is cooled by exchanging heat with the air (cool air) having passed through the indoor evaporator 26 in the indoor condenser 12. Thus, the air passing through the indoor condenser 12 is heated. The refrigerant flowing from the indoor condenser 12 is decompressed by the fixed throttle 14 to flow into the indoor evaporator 26.

The low-pressure refrigerant flowing into the indoor evaporator 26 absorbs heat from the air blown from the blower 32 to evaporate itself. Then, the air passing through the indoor evaporator 26 is cooled and dehumidified. Thus, the air cooled and dehumidified by the indoor evaporator 26 is heated again when passing through the heater core 36, the indoor condenser 12, and the PTC heater 37 to be blown from the mixing space 35 into the vehicle interior. That is, dehumidification of the vehicle interior can be performed. In the first dehumidification mode, the air conditioner can exhibit the adequate dehumidification capacity of the air, but has the small heating capacity.

The refrigerant flowing from the indoor evaporator 26 flows into the accumulator 29 via the temperature sensing portion 61a of the thermal expansion valve 27. The refrigerant is separated by the accumulator 29 into vapor and liquid phases, and the refrigerant in the vapor phase is sucked into and compressed again by the compressor 11.

Figure 4:
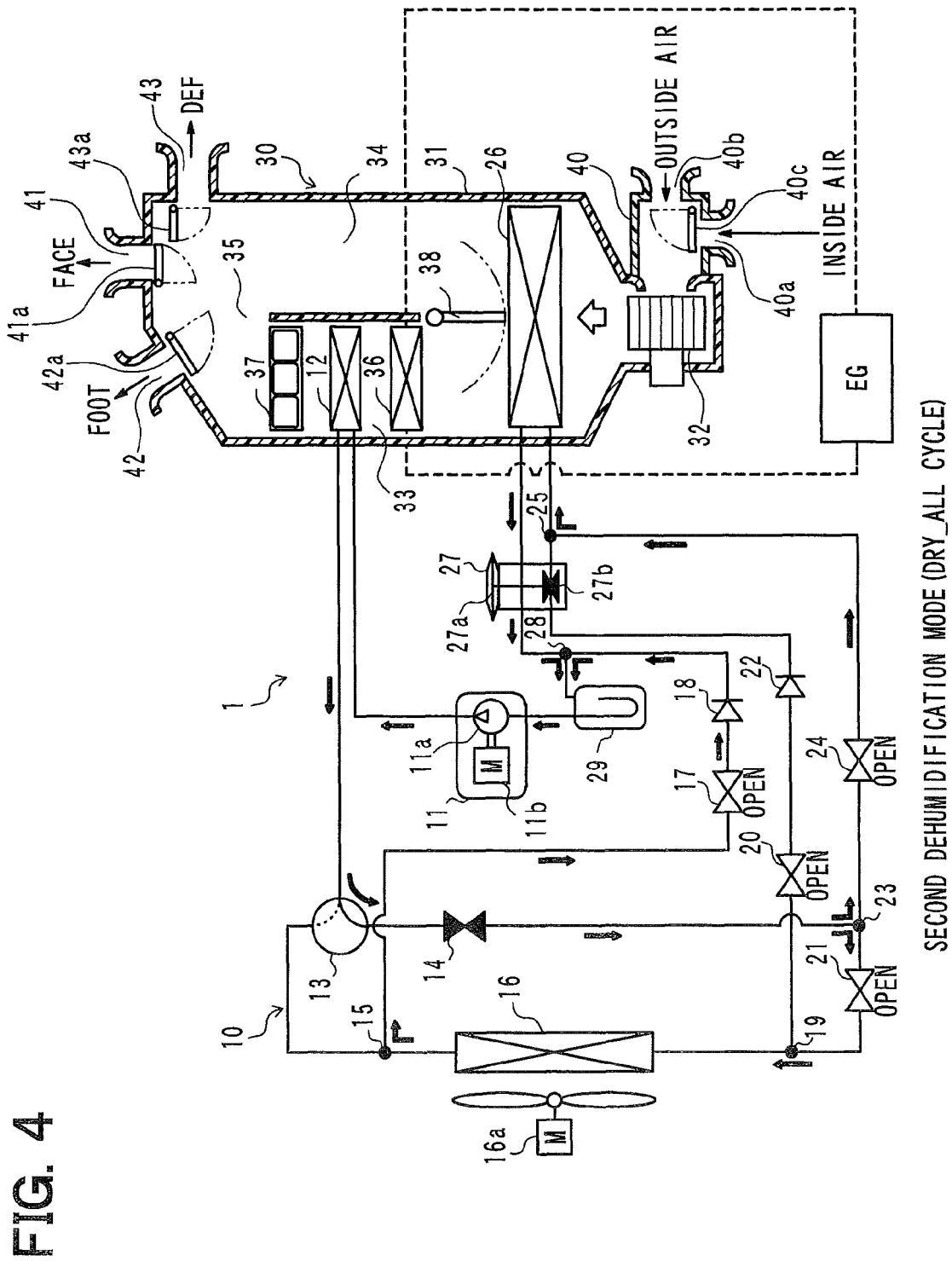
FIG. 4 is an entire configuration diagram showing the air conditioner for a vehicle with a refrigerant circuit in a second dehumidification mode according to the first embodiment.

(d) Second Dehumidification mode (DRY_ALL Cycle: see FIG. 4)

In the second dehumidification mode, the air conditioning controller 50 sets the electric three-way valve 13, the low-pressure electromagnetic valve 17, and the dehumidification electromagnetic valve 24 in the energization state, and the other electromagnetic valves 20 and 21 in the non-energization state. Thus, the electric three-way valve 13 connects the refrigerant outlet side of the indoor condenser 12 to the refrigerant inlet side of the fixed throttle 14, so that the low-pressure electromagnetic valve 17 is opened, the high-pressure electromagnetic valve 20 is opened, the heat exchanger interruption electromagnetic valve 21 is opened, and the dehumidification electromagnetic valve 24 is opened.

Thus, as illustrated by the arrows in FIG. 4, the vapor compression refrigeration cycle is constructed in the following manner. The refrigerant circulates through the compressor 11, the indoor condenser 12, the electric three-way valve 13, the fixed throttle 14, the third three-way joint 23, the heat exchanger interruption electromagnetic valve 21, the second three-way joint 19, the outdoor heat exchanger 16, the first three-way joint 15, the low-pressure electromagnetic valve 17, the first check valve 18, the fifth three-way joint 28, the accumulator 29, and the compressor 11 in that order. Further, the refrigerant circulates through the compressor 11, the indoor condenser 12, the electric three-way valve 13, the fixed throttle 14, the third three-way joint 23, the dehumidification electromagnetic valve 24, the fourth three-way joint 25, the indoor evaporator 26, the temperature sensing portion 27a of the thermal expansion valve 27, the fifth three-way joint 28, the accumulator 29, and the compressor 11 in that order.

That is, in the second dehumidification mode, the refrigerant flowing from the fixed throttle 14 into the third three-way joint 23 flows out toward both the heat exchanger interruption electromagnetic valve 21 and the dehumidification electromagnetic valve 24. Both the refrigerant flowing from the first check valve 18 into the fifth three-way joint 28 and the refrigerant flowing from the temperature sensing portion 27a of the thermal expansion valve 27 into the fifth three-way joint 28 are merged into one flow at the fifth three-way joint 28, which then flows out to the accumulator 29.

In the refrigerant circuit in the second dehumidification mode, the refrigerant flowing from the outdoor heat exchanger 16 into the first three-way joint 15 does not flow out toward the electric three-way valve 13 because the electric three-way valve 13 connects the refrigerant outlet side of the indoor condenser 12 to the refrigerant inlet side of the fixed throttle 14. The refrigerant flowing from the dehumidification electromagnetic valve 24 into the fourth three-way joint 25 does not flow out toward the variable throttle mechanism 27b of the thermal expansion valve 27 by the action of the second check valve 22.

Thus, the refrigerant compressed by the compressor 11 exchanges heat with the air (cool air) having passed through the indoor evaporator 26 in the indoor condenser 12. Thus, the air passing through the indoor condenser 12 is heated. The refrigerant flowing from the indoor condenser 12 is decompressed by the fixed throttle 14, and then divided by the third three-way joint 23 to flow into the outdoor heat exchanger 16 and the indoor evaporator 26.

The refrigerant flowing into the outdoor heat exchanger 16 absorbs heat from the air outside the vehicle compartment blown from the blower fan 16a to evaporate itself. The refrigerant flowing from the outdoor heat exchanger 16 flows into the fifth three-way joint 28 via the low-pressure electromagnetic valve 17, the first check valve 18, and the like. The low-pressure refrigerant flowing into the indoor evaporator 26 absorbs heat from the air blown from the blower 32 to evaporate itself. Thus, the air passing through the indoor evaporator 26 is cooled and dehumidified.

The air cooled and dehumidified by the indoor evaporator 26 is heated again while passing through the heater core 36, the indoor condenser 12, and the PTC heater 37, and is blown from the mixing space 35 into the vehicle interior. At this time, in the second dehumidification mode, heat absorbed by the outdoor heat exchanger 16 can be dissipated at the indoor condenser 12 as compared to in the first dehumidification mode, so that the air can be heated at higher temperature than in the first dehumidification mode. That is, in the second dehumidification mode, dehumidification and heating can be performed while exhibiting the high heating capacity and dehumidification capacity.

The refrigerant flowing from the indoor evaporator 26 flows into the fifth three-way joint 28 to be merged with the refrigerant flowing from the outdoor heat exchanger 16, and then to flow into the accumulator 29. The refrigerant is separated into vapor and liquid phases by the accumulator 29. The vapor-phase refrigerant is sucked into and compressed again by the compressor 11.

Next, the effects and advantages in the air conditioner for a vehicle will be described.

(1) According to the present embodiment, the air conditioning controller 50 outputs an engine operation request signal to the engine controller so as to operate the engine EG when the outdoor heat exchanger 16 is frosted, as in steps S40 and S43 of FIG. 10 and step S15 of FIG. 6. Thus, in the defrosting control of the outdoor heat exchanger 16, the heating of the vehicle compartment can be performed by using the engine coolant as the heat source.

Thus, even in a case where the hybrid car is traveling by using an electrical motor as a driving source and the engine EG is stopped, the heating of the vehicle compartment can be performed by operating the engine in the defrosting control of the outdoor heat exchanger 16. Thus, heating feeling given to a passenger is not reduced even in the defrosting control of the outdoor heat exchanger 16.

As the heat source for the heating of the vehicle compartment during the defrosting control, a combustion heater or an electrical heater such as the PTC heater may be used. However, when the heating means is used specially for only the heating of the vehicle compartment during the defrosting control, the size and the cost in the entire air conditioner are increased.

In the present embodiment, the engine coolant is used as the heat source for the heating of the vehicle compartment in the defrosting control, without using an additional heater. Thus, the size and the cost in the entire air conditioner can be effectively increased.

(2) In the air conditioning controller 50 of the present embodiment, in a case where the defrosting mode for defrosting the outdoor heat exchanger 16 is set, the engine EG is operated when the coolant temperature Tw is lower than TAO, and the operation of the heat pump cycle is maintained as shown in steps S40, S42 and S43 of FIG. 10. In this state, when the coolant temperature Tw is higher than the TAO at step S42, the cooler cycle is switched from the heat pump cycle. Thus, even when the defrosting mode is set for the outdoor heat exchanger 16, the operation of the heat pump cycle is continued until the coolant temperature Tw becomes higher than the TAO. Then, when the coolant temperature Tw becomes higher than the TAO, it is determined that a condition for the defrosting control is satisfied, and the cooler cycle is switched from the heat pump cycle, thereby performing the defrosting control of the outdoor heat exchanger 16.

If the step S42 is omitted in FIG. 10, the heating of the vehicle compartment may be deteriorated.

In the present embodiment, the operation of the heat pump cycle is continued until the coolant temperature Tw becomes higher than the TAO. Then, when the coolant temperature Tw becomes higher than the TAO, it is determined that the heat source for the heating of the vehicle compartment is sufficient and the condition for the defrosting control is satisfied. Thus, in this case, the operation cycle is switched from the heat pump cycle to the cooler cycle, thereby performing the defrosting control of the outdoor heat exchanger 16. Thus, even when the defrosting control due to the cooler cycle is switched from the heating due to the heat pump cycle, the heating of the vehicle compartment can be continuously performed without decreasing the temperature of air blown into the vehicle compartment. In the present embodiment, the coolant temperature Tw is compared with the TAO in step S42 of FIG. 10. However, in step S42, the coolant temperature Tw may be compared with a predetermined temperature other than TAO.

(3) In a case where the engine EG is unnecessary to be operated as the driving source of the vehicle traveling, if the engine EG is operated for only performing the defrosting control, the fuel consumption of the vehicle is deteriorated and an exhaust gas amount is increased, as compared with a hybrid car which does not operate the engine EG only for the defrosting control. Thus, it is prefer to perform the defrosting control while the engine operates, as compared with a case where the defrosting control is performed while the engine is stopped.

In the air conditioning controller 50 of the present embodiment, as in step S21 and step S22, the defrosting determination value used in the defrosting determination of step S23 is set higher when the engine is operated, than that when the engine is stopped. Thus, in the present embodiment, the frequency for turning on the engine in order to perform the defrosting control can be reduced, thereby improving fuel consumption and reducing the exhaust gas amount.

In the above-described embodiment, the frost of the outdoor heat exchanger 16 is determined by using the refrigerant suction temperature Tsi detected by the suction temperature sensor 57 arranged at a downstream refrigerant side of the outdoor heat exchanger 16. However, the frost of the outdoor heat exchanger 16 may be detected by a temperature sensor located at the outdoor heat exchanger 16.

The first and second predetermined temperatures T1 and T2 used at steps S21 and S22 of FIG. 9 are not limited to $-12°$ C. and $-11°$ C. The first and second predetermined temperatures T1 and T2 may be suitably changed such that the first predetermined temperature T1 is lower than the second predetermined temperature T2. A different between the second predetermined temperature T2 and the first predetermined temperature T1 may be set larger than $1°$ C. or may be set lower than $1°$ C.

In the air conditioning controller 50 of the present embodiment, as shown in steps S41 and S45, when the defrosting mode of the outdoor heat exchanger 16 is set while the economic mode is set, the engine operation request signal is not output to the engine EG, but a control signal is output to the PTC heater 37, thereby performing the heating of the vehicle compartment by using the PTC heater 37.

That is, when the economic mode is set, the engine EG is not turned on only to perform the defrosting control. Thus, in a case where the engine EG is not operated as the driving source of the vehicle traveling, it can prevent the engine EG from being operated in order to perform the defrosting control of the outdoor heat exchanger 16, thereby restricting the fuel consumption from being deteriorated.

In the present embodiment, in step S45, the PTC heater 37 is turned on without turning on the engine EG. However, in a case where the PTC heater 37 is operated in the heating due to the heat pump cycle, the operating ratio of the PTC heater 37 may be increased in step S45. For example, in a case where the PTC heater 37 is operated as an auxiliary heater in the heating of the vehicle compartment, the number of the PTC heaters 37 turned on may be increased, thereby increasing heating capacity of the PTC heaters 37 without turning on the engine EG.

In step S45, the operation of the PTC heater 37 is controlled to be turned on. However, in step S45, the seat heating device 38 may be turned on, instead of the PTC heater 37, or in addition with the operation of the PTC heater 37.

(5) In the air conditioning controller 50 of the present embodiment, in a case where the defrosting mode is set and the room temperature Tr of the vehicle compartment is higher than the predetermined temperature (e.g., $25°$ C.), it is determined that heating feeling given to a passenger is high. In this case, as shown in step S41 and S45, the engine operation request signal is not output to the engine EG, but the PTC heater 37 is operated so that heating of the vehicle compartment is performed by using the PTC heater 37.

When the room temperature Tr of the vehicle compartment is higher than the predetermined temperature (e.g., $25°$ C.), it is unnecessary to have a large heating capacity such as the heating capacity by using the engine coolant. Thus, in this case, even when the heating by the PTC heater 37 is performed, a sufficient heating feeling can be given to the passenger in the vehicle compartment. Furthermore, when the room temperature Tr of the vehicle compartment is higher than the predetermined temperature (e.g., $25°$ C.), the engine EG is not operated even in the defrosting control. Thus, it can restrict the deterioration of the fuel consumption and the increase of the exhaust gas amount.

The predetermined temperature used at the determination of step S41 is not limited to $25°$ C., but may be suitably changed. In the present embodiment, the heating feeling given to the passenger is determined to be high, based on the room temperature Tr of the vehicle compartment. However, the heating feeling given to the passenger may be determined to be high, based on a temperature of the passenger or a seat temperature or the like. That is, the heating feeling given to the passenger may be determined, based on the temperature of the passenger or a temperature around the passenger in the vehicle compartment. For example, an infrared sensor can be used for detecting the temperature of the passenger, and a temperature sensor can be located in a seat of the vehicle compartment to detect the temperature of the seat in the vehicle compartment.

In the present embodiment, when the room temperature Tr of the vehicle compartment is higher than the predetermined temperature (e.g., $25°$ C.), the PTC heater 37 is turned on in step S45. However, in a case where the PTC heater 37 is operated in the heating by the heat pump cycle, the operating ratio of the PTC heater 37 may be increased in step S45. For example, in a case where the PTC heater 37 is operated as an auxiliary heater in the heating of the vehicle compartment, the number of the PTC heaters 37 turned on may be increased, thereby increasing heating capacity of the PTC heaters 37.

In step S45, the operation of the PTC heater 37 is controlled to be turned on when the room temperature Tr is higher than the predetermined temperature. However, in step S45, the seat heating device 38 may be turned on, instead of the PTC heater 37, or in addition with the operation of the PTC heater 37.

In the air conditioning controller 50 of the present embodiment, as in steps S32 and S33 of FIG. 9, when the temperature Tsi of the refrigerant, having passed through the outdoor heat exchanger 16, detected by the suction temperature sensor 57 becomes higher than a predetermined temperature (e.g., 10° C.), it is estimated that the defrosting control of the outdoor heat exchanger 16 is finished, and thereby the defrosting control is ended. Thus, a time for which the defrosting control is performed can be effectively reduced.

Accordingly, a time, for which the engine EG is operated for performing the heating in the defrosting control, can be made shorter, and thereby, it can restrict the deterioration of the fuel consumption and the increase of the exhaust gas amount.

In the above-described embodiment, in step S32, the finishing of defrosting of the outdoor heat exchanger 16 is determined by using the refrigerant temperature Tsi detected by the suction temperature sensor 57 arranged at a refrigerant downstream side of the outdoor heat exchanger 16. However, the finishing of defrosting of the outdoor heat exchanger 16 may be detected by a temperature sensor located at the outdoor heat exchanger 16.

(7) In the air conditioning controller 50 of the present embodiment, at steps S25, S26 and S27 of FIG. 9, when the outside air temperature Tam is lower than 0° C., the time of the defrosting control is set at a first predetermined time (e.g., 10 minutes). In contrast, when the outside air temperature Tam is higher than 0° C., the time of the defrosting control is set at a second predetermined time (e.g., 5 minutes) that is shorter than the first predetermined time.

The defrosting of the outdoor heat exchanger 16 is finished earlier as the outside air temperature Tam becomes higher. In particular, the defrosting is finished earlier when the outside air temperature Tam is in an ice melting temperature area higher than 0° C., as compared with a case where the outside air temperature Tam is in a freezing temperature area equal to or lower than 0° C.

In the present embodiment, when the outside air temperature Tam is higher than 0° C., the defrosting time of the defrosting control can be set shorter, so that the defrosting control time can be restricted to a necessary minimum value. Thus, a time, for which the engine EG is operated for performing the heating of the vehicle compartment in the defrosting control, can be made shorter, and thereby, it can restrict the deterioration of the fuel consumption and the increase of the exhaust gas amount.

In the present embodiment, the determination value is set at 0° C. in step S25 of FIG. 9. However, in step S25, the determination value may be set at a temperature lower than 0° C. or a temperature higher than 0° C. Because the defrosting can be finished early when the outside air temperature Tam is in the ice melting temperature area, it is prefer to set the determination value at a predetermined temperature within the ice melting temperature area.

Second Embodiment

A second embodiment of the present invention will be described with reference to FIGS. 1-8 and 11.

In the present embodiment, the number of revolutions of the compressor 11 determined in step S11 of step S6 will be described.

Figure 11:
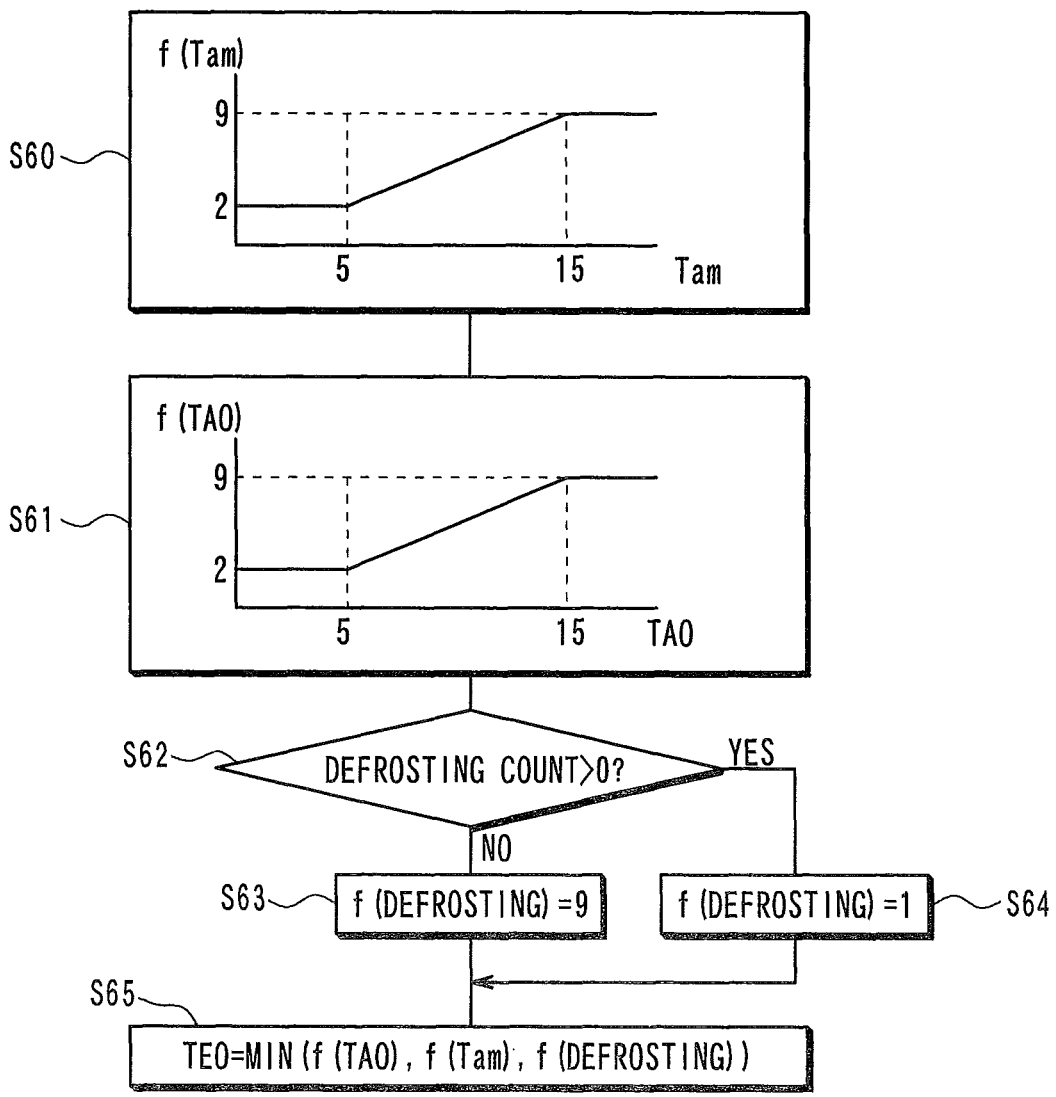
FIG. 11 is a flowchart showing a part of the control performed by an air conditioner for a vehicle according to a second embodiment of the invention.

FIG. 11 is a flow chart showing a part of step S11 of FIG. 6, for determining the target evaporator blown-air temperature TEO that is a target temperature of air flowing out of the indoor evaporator 26 in the cooler cycle (cooling mode).

The number of revolutions of the compressor 11 in the cooler cycle is determined using the control map stored in the air conditioning controller 50 based on the target evaporator blown-air temperature TEO, as described in step S11.

In the present embodiment, the target evaporator blown-air temperature TEO of the indoor evaporator 26 is determined based on the control process shown in FIG. 11.

In step S60, a temporal target outlet air temperature f(Tam) is determined based on the outside air temperature Tam by using a control map stored in the air conditioning controller 50. As in the control map of step S60 in FIG. 11, the temporal target outlet air temperature f(Tam) is set lower as the outside air temperature Tam becomes lower. The lowest temperature of the temporal target outlet air temperature f(Tam) is 2° C., and the highest temperature of the temporal target outlet air temperature f(Tam) is 9° C.

In step S61, a temporal target outlet air temperature f(TAO) is determined based on the target outlet air temperature TAO by using a control map stored in the air conditioning controller 50. As in the control map of step S61 in FIG. 11, the temporal target outlet air temperature f(TAO) is set lower as the target outlet air temperature TAO becomes lower. The lowest temperature of the temporal target outlet air temperature f(TAO) is 2° C., and the highest temperature of the temporal target outlet air temperature f(TAO) is 9° C.

Next, in step S62, it is determined whether or not the defrosting count is now performed. That is, it is determined whether the operation mode is in the defrosting mode of the outdoor heat exchanger 16 (i.e., defrosting flag=1).

When the defrosting mode is not performed, the determination of step S62 is NO. In this case, in step S63, a temporal target outlet air temperature f(Defrosting) is set at 9° C. that is the maximum temperature of the f(Tam) and the f(TAO). When the defrosting mode is performed, the determination of step S62 is YES. In this case, in step S64, a temporal target outlet air temperature f(Defrosting) is set at 1° C. that is the minimum temperature of the f(Tam) and the f(TAO).

Then, the smaller one among the f(Tam), the f(TAO) and the f(Defrosting) is selected as the target evaporator blown-air temperature TEO of the indoor evaporator 26 in the cooler cycle, in step S65. Thus, in the defrosting control of the outdoor heat exchanger 16, the target evaporator blown-air temperature TEO of the indoor evaporator 26 is always set at 1° C. determined at step S64, and thereby the TEO set at steps S60, S61 is corrected to be reduced in the defrosting control. On the other hand, in an operation control other than the defrosting control, the target evaporator blown-air temperature TEO of the indoor evaporator 26 is determined based on the f(Tam) or the f(TAO) temporarily set at step S60, S61.

Then, the number of revolutions of the compressor 11 in the cooler cycle is determined based on the target evaporator blown-air temperature TEO determined at step S65. In the above example shown in FIG. 11 of the second embodiment, the number of revolutions of the compressor 11 is set such that the TEO of the indoor evaporator 26 becomes 1° C., in the defrosting control of the outdoor heat exchanger 16. In contrast, in a control operation other than the defrosting control, the number of revolutions of the compressor 11 is set such that the TEO of the indoor evaporator 26 becomes a desired temperature in the temperature range of 2° C. to 9° C.

In the present embodiment, the TEO in the defrosting control of the outdoor heat exchanger 16 is set lower than the TEO in a control operation other than the defrosting control, as shown in FIG. 11. Thus, the cooling load of the refrigeration cycle 10 in the defrosting control can be increased, thereby increasing the temperature of the outdoor heat exchanger 16 in the defrosting control, as compared with that in a control operation other than the defrosting control.

Thus, according to the present embodiment, the defrosting of the outdoor heat exchanger 16 can be finished early and the defrosting time can be made shorter, as compared with a case where the target evaporator blown-air temperature TEO of the indoor heat exchanger 16 is the same in the defrosting control and the other control.

Thus, a time, for which the engine EG is operated for performing the heating in the defrosting control, can be made shorter, and thereby, it can restrict a deterioration of the fuel consumption and an increase of the exhaust gas amount, as compared with a case where the target evaporator blown-air temperature TEO of the indoor heat exchanger 16 is the same in the defrosting control and the other control.

In the present embodiment, by setting the TEO in the cooler cycle other than the defrosting control to be higher than the TEO in the defrosting control, the compressor operating ratio in the cooler cycle other than the defrosting control can be decreased as compared with that in the defrosting control. Thus, the cooler cycle other than the defrosting control can be effectively performed with a power saving operation. In the above-described second embodiment, the other parts may be similar to those of the above-described first embodiment.

Third Embodiment

A second embodiment of the present invention will be described with reference to FIGS. 1 to 8 and 12A-12B. In the present embodiment, the number of revolutions of the compressor 11 determined in step S11 of FIG. 6 will be described in detail.

Figures 12A, 12B:
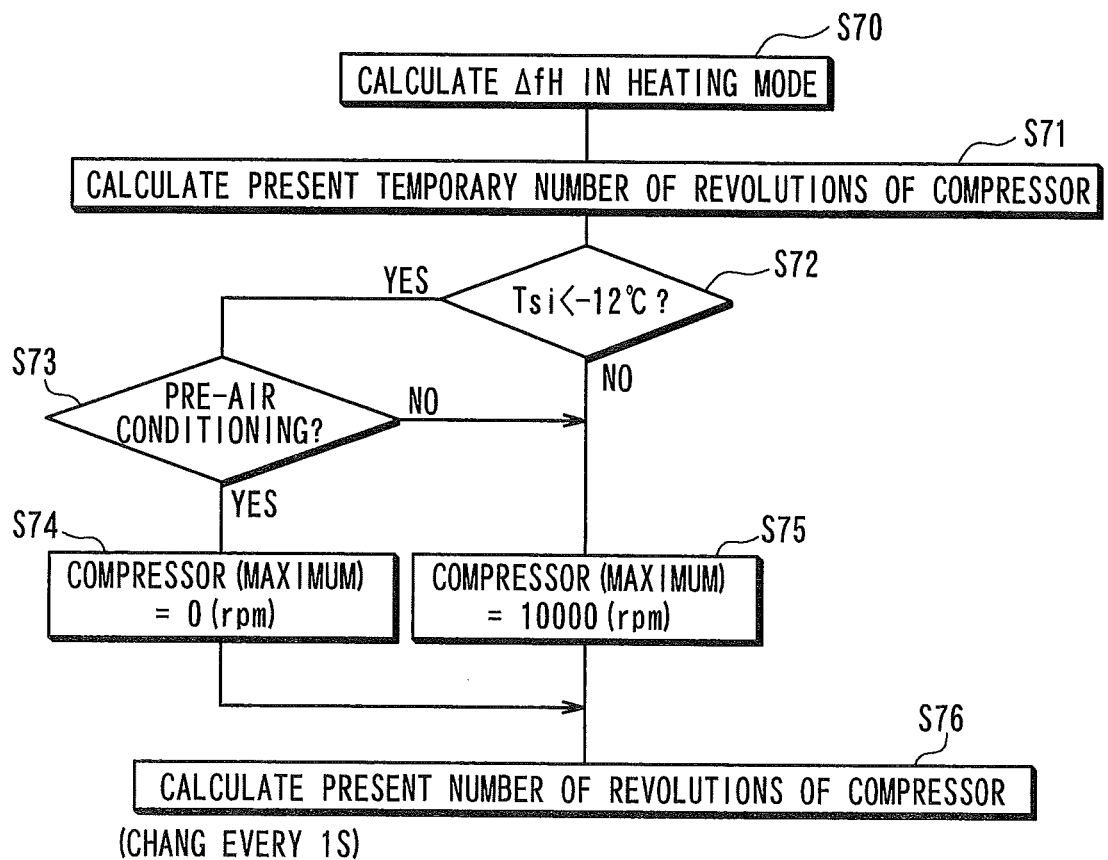
FIG. 12A is a flowchart showing a part of the control performed by an air conditioner for a vehicle according to a third embodiment of the invention.
FIG. 12B is a diagram for determining a change amount $\Delta fH$.

FIG. 12A is a flowchart showing a part of step S11 of FIG. 6. Control processing of the flow chart of FIG. 12A is performed when the automatic switch 60b is turned on, for example.

In step S70, a change amount ΔfH in the number of revolutions of the compressor 11 is calculated with respect to a previous number of revolutions fHn−1 of the compressor 11 by using a basic determination way in the heat pump cycle (heating mode). FIG. 12B shows an example of a rule of the fuzzy theory for determining the amount of change in number of revolutions ΔfH of the compressor 11, based on a pressure deviation Pn and a change ratio PDOT.

Then, in step S71, the present temporary number of revolutions of the compressor 11 is determined. The present temporary number of revolutions of the compressor 11 is obtained by adding the amount of change in number of revolutions Δf of the compressor 11 determined in step S70 to the previous number of revolutions of the compressor 11. That is, the present temporary number of revolutions of the compressor 11=the amount of change in number of revolutions Δf of the compressor 11+the previous number of revolutions of the compressor 11

Then, in step S72, it is determined whether or not the refrigerant suction temperature Tsi is lower than a frost determination temperature (e.g., −12° C.). That is, in step S72, it is determined whether or not the outdoor heat exchanger 16 is frosted When the refrigerant suction temperature Tsi detected by the suction temperature sensor 57 is lower than the frost determination temperature (e.g., −12° C.) in step S72, it is determined whether a pre-air conditioning is set in step S73. When the pre-air conditioning is set in step S73, the maximum number of revolutions of the compressor 11 is set at 0 rpm in step S74, thereby to stop the compressor 11.

When the refrigerant suction temperature Tsi detected by the suction temperature sensor 57 is equal to or higher than the frost determination temperature (e.g., −12° C.) in step S72, or when the pre-air conditioning is not set in step S73, the maximum number of revolutions of the compressor 11 is set at 10000 rpm in step S75. When the maximum number of revolutions of the compressor 11 is set at 10000 rpm in step S75, the number of revolutions of the compressor 11 is substantially not limited.

After the step S74 or step S75, a present number of revolutions of the compressor 11 is finally determined in step S76. In the present example, the smaller one between the present temporary number of revolutions of the compressor 11 determined in step S71 and the maximum number of revolutions of the compressor 11 determined in step S74 or step S75 is set as the present number of revolutions of the compressor 11.

In the present embodiment, the engine EG is set to be not operated in the pre-air conditioning.

When the pre-air conditioning is performed in the vehicle without operating the engine EG, the engine EG is generally not operated in order to obtain the heat source for the heating of the vehicle compartment in the defrosting control of the outdoor heat exchanger 16.

If the defrosting control of the outdoor heat exchanger 16 is switched from the heating operation by the heat pump cycle during the pre-air conditioning, the room temperature of the vehicle compartment is decreased by the operation of the cooler cycle. In this case, the heating feeling given to a passenger in the vehicle compartment is deteriorated in the pre-air conditioning.

In contrast, in the present embodiment, during the pre-air conditioning, the compressor 11 is stopped thereby stopping the operation of the refrigeration cycle 10. That is, during the pre-air conditioning, the defrosting control is not performed, thereby preventing the heating feeling from being decreased, In the present embodiment, during the pre-air conditioning, when the outdoor heat exchanger 16 is frosted in the heating by the heat pump cycle so that the heating efficiency is deteriorated, the operation of the heat pump cycle is stopped. When the operation of the heat pump cycle is stopped in the pre-air conditioning, the frost formed on the outdoor heat exchanger 16 is melted, so that a defrosting time of the defrosting control, after the passenger rides on the vehicle, can be shortened.

In the present embodiment, when it is determined that the outdoor heat exchanger 16 is frosted in the pre-air conditioning at steps S72 and S73, the operation of the heat pump cycle is stopped at step S74, S76. However, while the temperature of the indoor condenser 12 is sufficiently high when the operation of the heat pump cycle is stopped, the blower 32 in the casing 31 may be operated so that air blown by the blower 32 is heated by the indoor condenser 12. In the third embodiment, the other parts may be similar to those of the above-described first embodiment.

Fourth Embodiment

Figure 13:
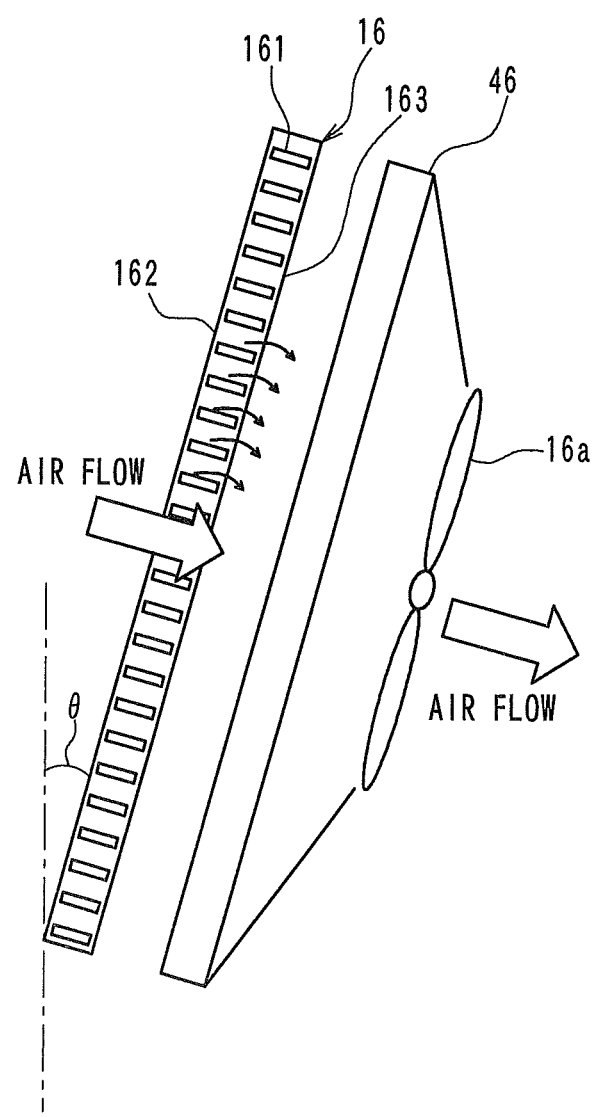
FIG. 13 is a schematic diagram showing an outdoor heat exchanger in a state mounted to a vehicle, according to a fourth embodiment of the invention.

A fourth embodiment of the present embodiment will be described with reference to FIGS. 1 to 8 and 13. FIG. 13 is a schematic diagram showing an arrangement state of an outdoor heat exchanger 16 of the refrigeration cycle 10, in a vehicle, according to the fourth embodiment of the invention. In FIG. 13, the up-and-down direction corresponds to a vertical direction.

In the present embodiment, the outdoor heat exchanger 16, adapted as a heat absorber in the heat pump cycle, is integrated with a radiator 46 and a blower fan 16a to form an integrated member, and the integrated member is arranged in an engine room of the vehicle. The outdoor heat exchanger 16 is disposed to be tilted with respect to the vertical direction so that a flow direction of air passing through the outdoor heat exchanger 16 is toward a lower side with respect to the horizontal direction, as shown in FIG. 13.

A core portion of the outdoor heat exchanger 16 includes a plurality of flat tubes 161, and fins provided at outer surfaces of the flat tubes 161. The flat tubes 161 and the fins are arranged such that the flow direction of air passing through the outdoor heat exchanger 16 is approximately perpendicular to heat-exchange core surfaces 162, 163. The heat-exchange core surfaces 162, 163 are end surfaces of the core portion of the outdoor heat exchanger 16 in the air flow direction. In the core portion of the outdoor heat exchanger 16, heat exchange is performed between the refrigerant and air. The heat-exchange core surface 162 on the upstream air side and the heat-exchange core surface 163 on the downstream air side are tilted by a predetermined angle θ, with respect to the vertical direction. The outdoor heat exchanger 16 is disposed to be tilted with respect to the vertical direction so that the flow direction of air passing through the outdoor heat exchanger 16 is tilted to a lower side with respect to the horizontal direction, as shown in FIG. 13.

When water generated in the defrosting control remains in the outdoor heat exchanger 16, frost may be easily formed on the outdoor heat exchanger 16 if the operation of the heat pump cycle is restarted. In the present embodiment, the outdoor heat exchanger 16 is tilted so that air passes through the outdoor heat exchanger 16 to be obliquely downwardly. Therefore, water can easily flow outside of the outdoor heat exchanger 16, and can easily fall downwardly from the outdoor heat exchanger 16. Thus, it can prevent frost from being easily caused on the outdoor heat exchanger 16 after the operation of the heat pump cycle is restarted.

Furthermore, because ice contained in water also falls easily in the defrosting control, defrosting time can be shortened. As a result, even when the defrosting control is switched from the heating of the vehicle compartment, it is possible to be rapidly switched from the defrosting control to the general heating. Thus, in the present embodiment, the operating time of the engine EG can be shortened, thereby preventing the fuel consumption from being deteriorated.

As a modification of the present embodiment, the outdoor heat exchanger 16 may be arranged to extend in the vertical direction while the tubes and the fins are tilted with respect to the vertical direction. Even in this case, the same effects as the present embodiment can be obtained. However, in this case, product cost may be increased because the arrangement of the outdoor heat exchanger 16 is not general.

According to the present embodiment, because a general heat exchanger can be used as the outdoor heat exchanger 16, the product cost of the outdoor heat exchanger 16 can be effectively reduced.

In the present embodiment, the outdoor heat exchanger 16 is tilted with respect to the vertical direction. However, the outdoor heat exchanger 16 may be arranged to extend in the horizontal direction. In this case, the flow direction of air passing through the outdoor heat exchanger 16 is directed to a vertical lower side, and thereby water easily falls downwardly. For example, the angle θ of the heat-exchange core surfaces 162, 163 may be set in a range of 10 degrees to 90 degrees. In this case, defrosting time can be effectively shortened. In the present embodiment, the other parts are similar to those of the above-described any one embodiment.

Fifth Embodiment

A fifth embodiment of the present invention will be described with reference to FIGS. 1 to 8 and 14.

In step S12 of FIG. 6, an operating ratio (e.g., number of revolutions) of the blower fan 16*a* for blowing outside air toward the outdoor heat exchanger 16 is determined. In the fifth embodiment, the control of step S12 of FIG. 6 will be described in detail. In the present embodiment, during the defrosting control of the outdoor heat exchanger 16, when the temperature of the outside air is higher than a predetermined temperature within an ice melting temperature area, the operating ratio of the blower fan 16*a* is set higher than that when the temperature of the outside air is not higher than the predetermined temperature within the ice melting temperature area. In this case, the defrosting time can be made shorter.

Figure 14:
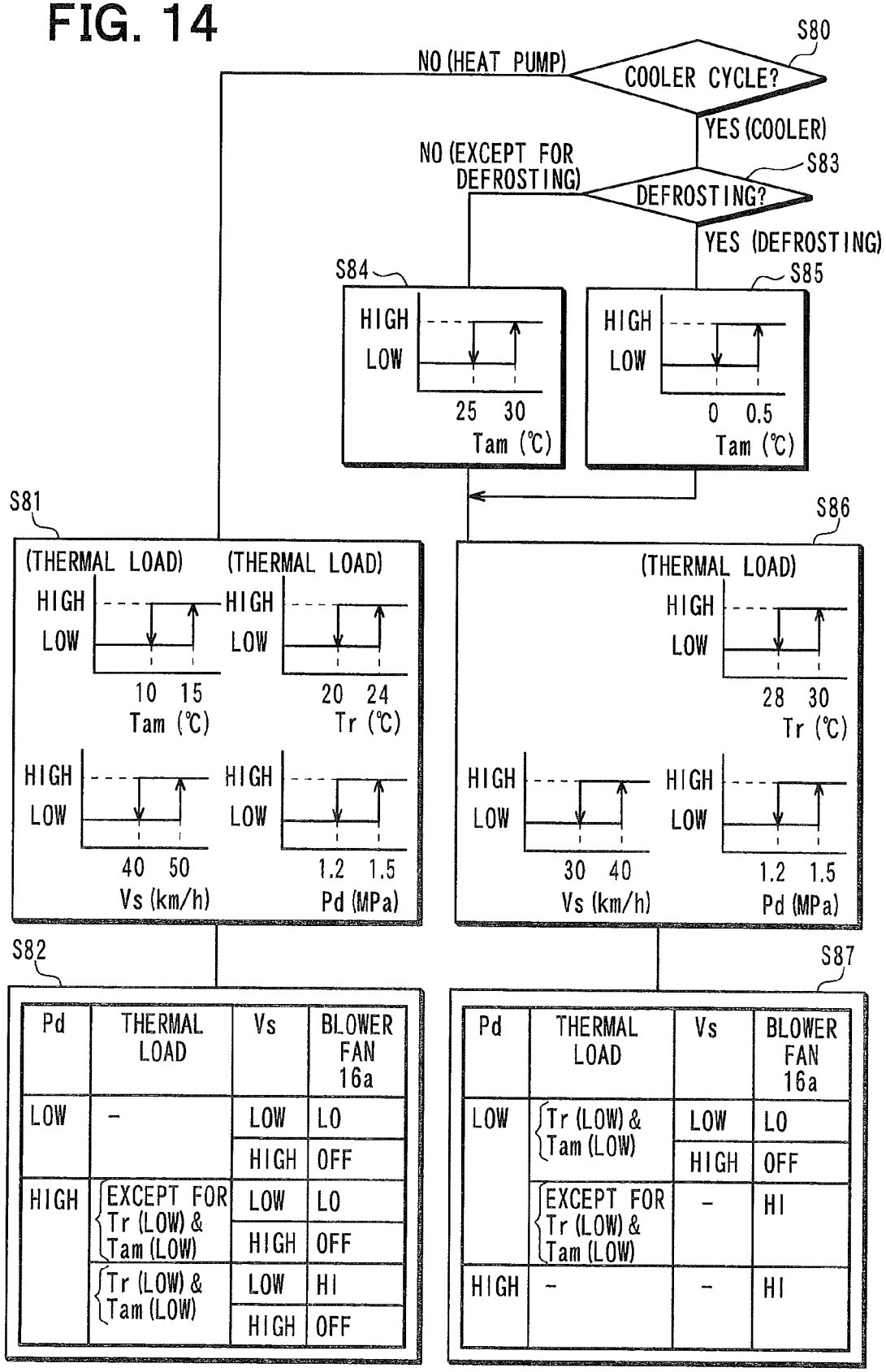
FIG. 14 is a flowchart showing a part of the control performed by an air conditioner for a vehicle according to a fifth embodiment of the invention.

FIG. 14 is a flowchart for determining the operating ratio of the blower fan 16*a* in the present embodiment.

In step S80, it is determined whether the refrigeration cycle 10 is operated as a cooler cycle including the defrosting mode.

At this time, when the refrigeration cycle 10 is operated as the heat pump cycle, the control program moves to step S81, and respective necessary parameters are determined in order to determine the operating ratio of the blower fan 16*a* in the heat pump cycle.

As the parameters necessary for determining the operating ratio of the blower fan 16*a*, it is determined whether the refrigerant pressure Pd detected by the discharge pressure sensor 55 is a high pressure or a low pressure, whether the outside air temperature Tam is a high outside air temperature or a low outside air temperature, whether the room temperature Tr is a high room temperature or a low room temperature, and whether the vehicle speed Vs is a high vehicle speed or a low vehicle speed, as shown in step S81 of FIG. 14. In step S81, the outside air temperature Tam and the inside air temperature Tr are used for calculating the thermal load.

Next, in step S82, the operating ratio of the blower fan 16*a* is determined by using the determination result of step S81. For example, as in the map shown in step S82 of FIG. 14, based on the refrigerant pressure Pd, the thermal load (Tam, Tr) and the vehicle speed Vs, the operating ratio of the blower fan 16*a* is determined. In the example of S82, the operating ratio of the blower fan 16*a* can be selected from among the "HI", "LO" and "OFF". When the operating ratio of the blower fan 16*a* is set at the "HI", the air blowing capacity becomes maximum. When the operating ratio of the blower fan 16*a* is set at the "LO", the air blowing capacity becomes minimum. When the operating ratio of the blower fan 16*a* is set at the "OFF", the blower fan 16*a* is stopped so that the air blowing capacity becomes zero.

Specifically, when the refrigerant pressure Pd is a high refrigerant pressure and the thermal load is large (the low room temperature and the low outside air temperature), a high heating capacity is necessary. In this case, when the vehicle speed Vs is low, the operating ratio of the blower fan 16*a* is set at the "HI" so that air blowing capacity becomes maximum. When the refrigerant pressure Pd is the high refrigerant pressure and the thermal load is not large (other than the low room temperature and the low outside air temperature), the high heating capacity is unnecessary. In this case, when the vehicle speed Vs is low, the operating ratio of the blower fan 16*a* is set at the "LO" so that air blowing capacity becomes minimum. In contrast, when the refrigerant pressure Pd is the low refrigerant pressure, the high heating capacity is unnecessary. In this case, the vehicle speed Vs is low, the operating ratio of the blower fan 16*a* is set at the "LO" so that air blowing capacity becomes minimum. On the other hand, when the vehicle speed Vs is high, wind can be introduced to the outdoor heat exchanger 16 even when the blower fan 16*a* is not operated.

Thus, when the vehicle speed Vs is a high speed, the operating ratio of the blower fan 16a is set zero, regardless of the other parameters.

When the refrigeration cycle 10 is operated as the cooler cycle in step S80, the control program moves to step S83 in which it is determined whether the defrosting mode is performed. When the determination of step S83 is NO, the control program moves to step S84, and it is determined whether the outside air temperature Tam is higher than a predetermined temperature or lower than the predetermined temperature in step S84. That is, in step S84, it is determined whether the outside air temperature Tam is a high or a low in the cooler cycle other than the defrosting mode. Next, in step S86, respective parameters other than the outside air temperature Tam are determined in order to determine the operating ratio of the blower fan 16a, similarly to step S81.

When the defrosting mode is performed in step S83, the control program moves to step S85 in which it is determined whether the outside air temperature Tam is high or low by using a determination value that is generally lower than a determination value used in step S84. In the present embodiment, as shown in the map of step S85 of FIG. 14, the determination value is set in a range of 0° C.-0.5° C. with hysteresis, thereby preventing a control hunting. Next, in step S86, the respective parameters other than the outside air temperature Tam are determined in the defrosting control, in order to determine the operating ratio of the blower fan 16a, similarly to step S81.

Next, in step S87, the operating ratio of the blower fan 16a is determined by using the determination results of steps S84, S85, S86 in the cooler cycle. Specifically, in a case where the refrigerant pressure Pd is a low refrigerant pressure, when the room temperature Tr is low and the outside air temperature Tam is low in the cooler cycle, the thermal load is small, and a high heating capacity is unnecessary. In this case, when the vehicle speed Vs is low, the operating ratio of the blower fan 16a is set at the "LO" so that air blowing capacity becomes minimum. In contrast, when the vehicle speed Vs is high, it is unnecessary to operate the blower fan 16a, so that the blower fan 16a is set at the "OFF". In a case where the refrigerant pressure Pd is a low refrigerant pressure, when the thermal load is large (other than the low room temperature and the low outside air temperature) in the cooler cycle, the high heating capacity is necessary, and thereby the operating ratio of the blower fan 16a is set at the "HI" so that air blowing capacity becomes maximum. In contrast, when the refrigerant pressure Pd is high, the operating ratio of the blower fan 16a is set at the "HI" so that air blowing capacity becomes maximum, regardless of the other paragraphs.

In the present embodiment, when the cooler cycle is selected in the defrosting control of the outdoor heat exchanger 16, the control program moves from step S80 to steps S83, S85, S86 and S87 in this order.

In the winter, the room temperature Tr of the vehicle compartment is generally lower than 28° C. in step S86. Thus, in the winter, it is determined that the room temperature Tr as the thermal load is a low room temperature in step S86. Furthermore, when the outside air temperature Tam is lower than 0° C., it is determined that the outside air temperature Tam is a low outside air temperature in step S85. Thus, when the refrigerant pressure Pd is a low and the outside air temperature Tam is lower than 0° C., the thermal load is in a "low room temperature and low outside air temperature", as in the map of step S87 in FIG. 14. In this case, when the vehicle speed Vs is a low vehicle speed, the blower fan 16a is operated at the "LO" so that the air blowing capacity becomes minimum.

In the winter, when the outside air temperature Tam is higher than 0.5° C. during the defrosting control, it is determined that the outside air temperature Tam is a high outside air temperature in step S85, but it is determined that inside air temperature Tr is a low inside air temperature in step S86. Thus, when the refrigerant pressure Pd is a low and the outside air temperature Tam is higher than 0.5° C., the thermal load is a load other than the "low room temperature and low outside air temperature", as in the map of step S87 in FIG. 14. In this case, the blower fan 16a is operated at the "HI" so that the air blowing capacity becomes minimum, regardless of the vehicle speed.

Thus, in the present embodiment, when the outside air temperature Tam is higher than a predetermined temperature (e.g., 0.5° C.) of an ice-melting start temperature area in the defrosting control, the controller controls the operating ratio of the blower fan 16a to be higher than that when the outside air temperature Tam is lower than the predetermined temperature of the ice-melting start temperature in the defrosting control. In the present embodiment, the ice-melting start temperature area is set in a range of 0° C. to 0.5° C.

In the defrosting control, when the outside air temperature Tam is higher than 0° C., the defrosting can be facilitated by the blown outside air even in the winter. Thus, in the present embodiment, when the outside air temperature Tam is higher than 0° C. in the winter, the blower fan 16a is operated at the "HI", thereby facilitating the defrosting and shortening the defrosting time.

When the melted water remains on the outdoor heat exchanger 16 in the defrosting control, frost is re-formed on the outdoor heat exchanger 16 immediately after the operation of the heat pump cycle is re-started. In the present embodiment, the blower fan 16a is operated at the "HI" so that melted water is removed from the outdoor heat exchanger 16 in the defrosting, thereby reducing the frost due to the remaining water. When the blower fan 16a is operated at the "HI" in the defrosting control, the outdoor heat exchanger 16 is vibrated by the variation of the blower fan 16a. Thus, water or ice contained in water can fall downwardly from the outdoor heat exchanger 16 due to the vibration of the outdoor heat exchanger 16.

In the present embodiment, the ice-melting start temperature area is set in a range of 0° C. to 0.5° C., and the predetermined temperature for determining the outside air temperature Tam is set in the ice-melting start temperature area. However, the predetermined temperature for determining the outside air temperature Tam may be set at a temperature in an ice-melting temperature area higher than 0.5° C. For example, the ice-melting temperature area may be set in a range of 2° C. to 2.5° C. As an example, when the outside air temperature Tam is higher than 2.5° C. in the defrosting control, the blower fan 16a is operated at the "HI" regardless of the vehicle speed. In contrast, in a case where the outside air temperature Tam is lower than 2° C. in the defrosting control, the blower fan 16a is operated at the "LO" when the vehicle speed Vs is low, and the blower fan 16a is set at the "OFF" when the vehicle speed Vs is high. In the present embodiment, the other parts may be similar to any one of the above-described first to fourth embodiments.

Sixth Embodiment

A sixth embodiment of the present invention will be described with reference to FIGS. 1 to 8 and 15.

In step S12 of FIG. 6, an operating ratio (e.g., number of revolutions) of the blower fan 16a for blowing outside air toward the outdoor heat exchanger 16 is determined. In the sixth embodiment, the control of step S12 of FIG. 6 will be described in detail. In the present embodiment, during the defrosting control of the outdoor heat exchanger 16, the operating ratio of the blower fan 16a is set lower when the temperature of the outside air is lower than a predetermined temperature within a freezing temperature area. In this case, the defrosting time can be made shorter.

Figure 15:
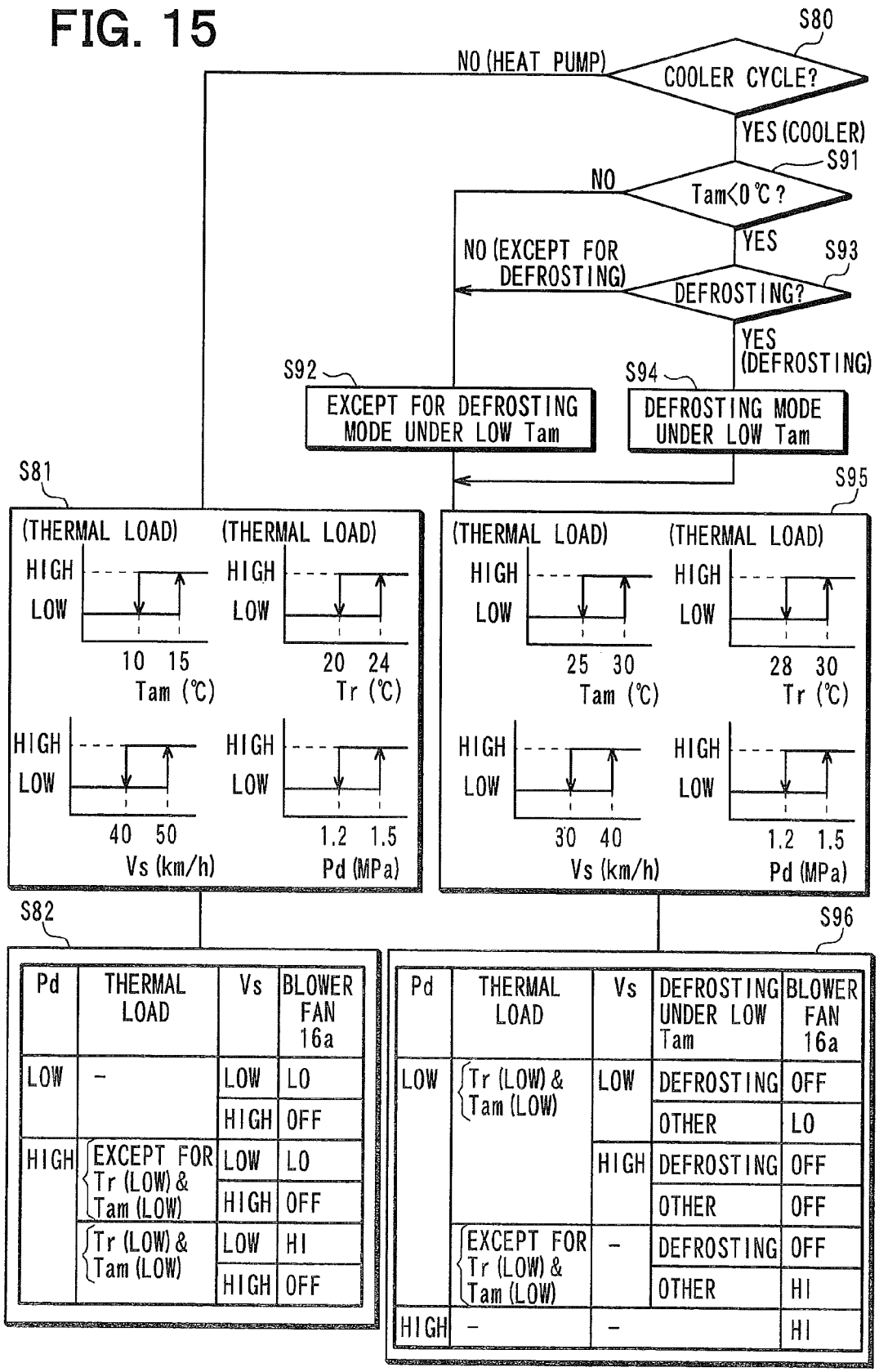
FIG. 15 is a flowchart showing a part of the control performed by an air conditioner for a vehicle according to a sixth embodiment of the invention.

FIG. 15 is a flowchart for determining the operating ratio of the blower fan 16a in the present embodiment. In the present embodiment, the parts different from those of the fifth embodiment will be mainly described.

In step S80, it is determined whether the refrigeration cycle 10 is operated as the cooler cycle including the defrosting mode. At this time, when the operation mode of the refrigeration cycle 10 is the heat pump cycle, steps S81 and S82 are performed similarly to steps S81 and S82 of FIG. 14 of the fifth embodiment. When the operation mode of the refrigeration cycle 10 is the cooler cycle, the control program moves from step S80 to step S91 and the following steps, and respective parameters are determined in order to determine the operating ratio of the blower fan 16a. For example, at steps S91 to S94, it is determined whether or not a "defrosting mode under a low temperature" is performed.

Specifically, at step S91, it is determined whether the outside air temperature Tam is lower than 0° C. When the outside air temperature Tam is not lower than 0° C., it is determined than the operation mode is a mode other than the "defrosting mode under a low outside air temperature".

When the outside air temperature Tam is lower than 0° C., the control program moves to step S93 in which it is determined whether the defrosting mode is performed. When the determination of step S93 is NO, the control program moves to step S92 in which the operation mode is set at a mode other than the "defrosting mode under a low outside air temperature". When the determination of step S93 is YES, the control program moves to step S94 in which the operation mode is set at the "defrosting mode under a low outside air temperature".

Next, in step S95, the respective parameters other than the "defrosting mode under a low outside air temperature" are determined in order to determine the operating ratio of the blower fan 16a in the cooler cycle. For example, the parameters other than the "defrosting mode under a low outside air temperature" include the outside air temperature Tam, the room temperature Tr of the vehicle compartment, the vehicle speed Vs and the refrigerant pressure Pd. In the present embodiment, the thermal load is determined by using the same outside air temperature Tam, regardless of the defrosting mode or a mode other than the defrosting mode.

Next, in step S96, the operating ratio of the blower fan 16a is determined by using the determination results of steps S92, S94, S95.

In the present embodiment, because the cooler cycle is selected in the defrosting control of the outdoor heat exchanger 16, the control program moves to step S91 from step S80.

In the winter, when the outside air temperature Tam is higher than 0° C. during the defrosting control in step S91, it is determined that the operation mode is a mode other than the "defrosting mode under a low outside air temperature" in step S92. Next, it is determined whether the room temperature Tr as the thermal load is a low room temperature in step S95 in the winter. For example, in step S95 of FIG. 15, because the room temperature Tr is generally lower than 28° C. in the winter, it is determined that the room temperature Tr of the vehicle compartment is the low room temperature as the thermal load. Furthermore, because the outside air temperature Tam is generally lower than 25° C. in the winter, it is determined that the outside air temperature Tam is the low outside air temperature as the thermal load. Thus, the thermal load is in a "low room temperature and low outside air temperature", and the operation mode is a mode other than the "defrosting mode under a low outside air temperature". Thus, when the vehicle speed Vs is a low vehicle speed, the blower fan 16a is operated at the "LO" so that the air blowing capacity becomes minimum, as in step S96. In contrast, when the vehicle speed Vs is a high vehicle speed, the blower fan 16a is set at the "OFF"

In the winter, when the outside air temperature Tam is lower than 0° C. during the defrosting control in steps S91 and S92, it is determined that the operation mode is the "defrosting mode under a low outside air temperature" in step S94. Next, it is determined whether the room temperature Tr as the thermal load is a low room temperature and the outside air temperature Tam as the thermal load is a low outside air temperature lower than 25° C. in step S95, in the winter. In the winter, when the outside air temperature Tam is lower than 0° C., the thermal load is in a "low room temperature and low outside air temperature", and the operation mode is the "defrosting mode under a low outside air temperature". Thus, the blower fan 16a is set at the "OFF", regardless of the vehicle speed.

Thus, in the present embodiment, in a case where the refrigerant pressure Pd is a low pressure, where the thermal load is in the "low room temperature and low outside air temperature", and where the vehicle speed Vs is a low vehicle speed, when the outside air temperature Tam is lower than 0° C. during the defrosting control, it is determined that the operation mode is the "defrosting mode under a low outside air temperature". Because the defrosting is performed when the outside air temperature Tam is lower than 0° C., the operating ratio of the blower fan 16a is set at the "OFF" so that air is not blown to the outdoor heat exchanger 16. In contrast, when the defrosting is performed while the outside air temperature Tam is higher than 0° C., the operation mode is a mode other than the "defrosting mode under a low outside air temperature", and thereby the operating ratio of the blower fan 16a is set the "LO". That is, when the defrosting is performed in a case where the outside air temperature Tam is lower than 0° C., the operating ratio of the blower fan 16a is set lower than that when the defrosting is performed in a case where the outside air temperature Tam is not lower than 0° C.

If outside air is blown to the outdoor heat exchanger 16 when the outside air temperature Tam is in a freezing temperature lower than 0° C., the melted water may be re-frozen, and thereby the defrosting time becomes longer. Thus, in the present embodiment, when the outside air temperature Tam is in the freezing temperature area lower than 0° C. in the winter, the blower fan 16a is stopped, thereby preventing a re-freezing and shortening the defrosting time.

In the present embodiment, when the defrosting control is performed at an outside air temperature Tam in the freezing temperature area lower than 0° C., the blower fan 16a is stopped. However, when the defrosting control is performed at the outside air temperature Tam in the freezing temperature area lower than 0° C., the operating ratio of the blower fan 16a may be selected at a level lower than the "LO".

In the present embodiment, a predetermined temperature for determining the outside air temperature Tam in the freezing temperature area is set at 0° C. However, the predetermined temperature for determining the outside air temperature Tam may be set at a temperature in the freezing temperature area lower than 0° C. For example, the predetermined temperature in the freezing temperature area may be −1° C. As an example, when the outside air temperature Tam is higher than −1° C., the blower fan 16*a* is operated at the "LO". In contrast, when the outside air temperature Tam is lower than −1° C., the blower fan 16*a* is operated at the "OFF".

Seventh Embodiment

A seventh embodiment of the present invention will be described with reference to FIGS. 1 to 8 and 16.

In step S12 of FIG. 6, an operating ratio (e.g., number of revolutions) of the blower fan 16*a* for blowing outside air toward the outdoor heat exchanger 16 is determined. In the seventh embodiment, the control of step S12 of FIG. 6 will be described in detail. In the present embodiment, during the defrosting control of the outdoor heat exchanger 16, the operating ratio of the blower fan 16*a* is set higher when ice-melting of frost formed on the outdoor heat exchanger 16 is proceeding. In this case, the defrosting time can be made shorter.

Figure 16:
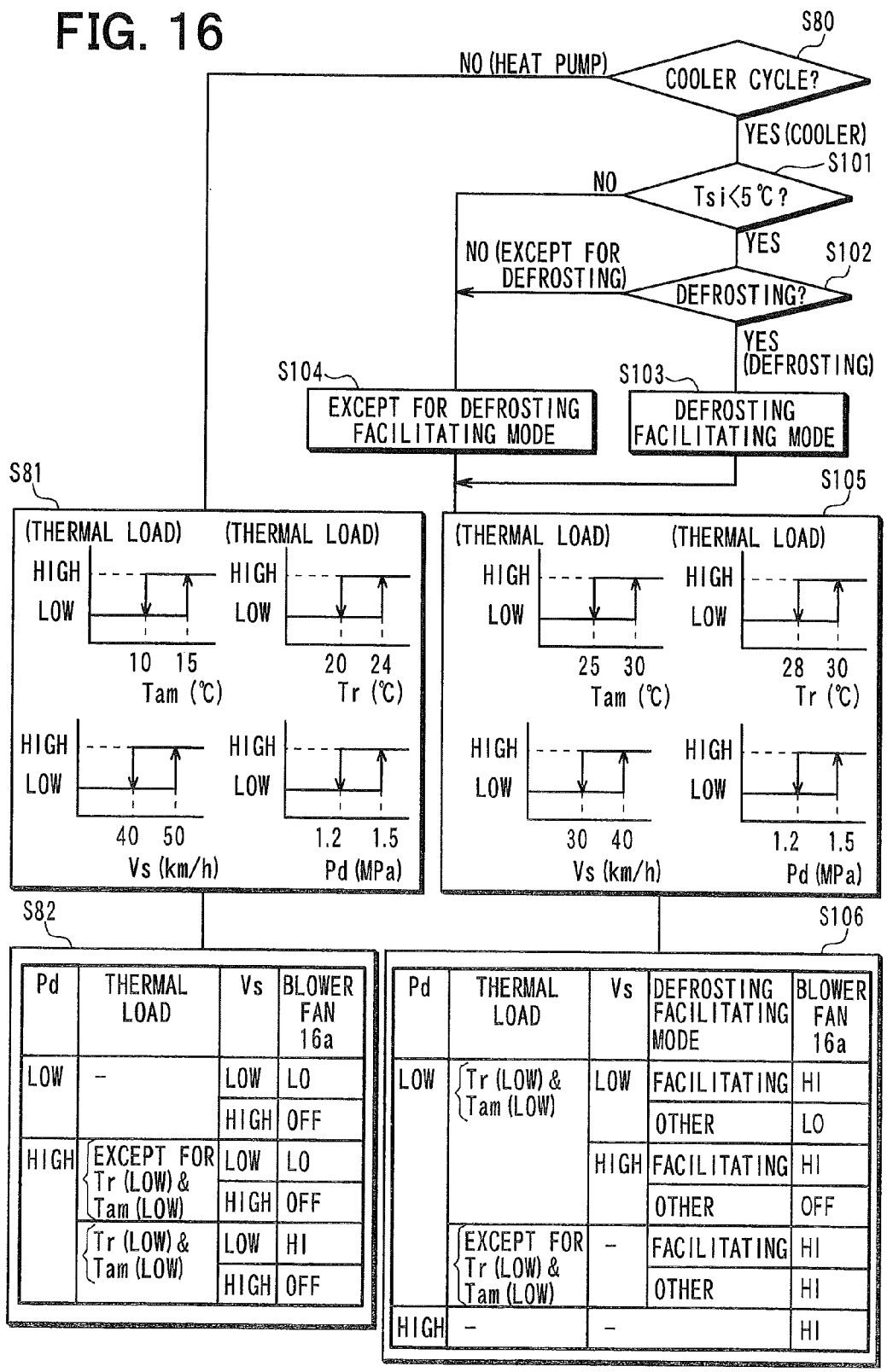
FIG. 16 is a flowchart showing a part of the control performed by an air conditioner for a vehicle according to a seventh embodiment of the invention.

FIG. 16 is a flowchart for determining the operating ratio of the blower fan 16*a* in the present embodiment. In the present embodiment, the parts different from those of the fifth embodiment will be mainly described.

In step S80, it is determined whether the refrigeration cycle 10 is operated as a cooler cycle including the defrosting mode. When the operation mode of the refrigeration cycle 10 is the heat pump cycle, steps S81 and S82 are performed similarly to the fifth embodiment. When the operation mode of the refrigeration cycle 10 is the cooler cycle, the control program moves from step S80 to step S101 and the following steps, and respective parameters including a defrosting facilitating mode are determined in order to determine the operating ratio of the blower fan 16*a*. For example, at steps S101, it is determined whether or not a defrosting facilitating mode is performed. The defrosting facilitating mode is performed in a defrosting stage where a melted area of the frost attached to the outdoor heat exchanger 16 is larger than a frost remaining area in the outdoor heat exchanger 16.

For example, in step S101, it is determined whether or not the refrigerant suction temperature Tsi is higher than a predetermined temperature (e.g., 5° C.). When the refrigerant suction temperature Tsi detected by the suction temperature sensor 57 is higher than the predetermined temperature (e.g., 5° C.) in step S101, it is determined whether the defrosting control is now performing at step S102. When the determination of step S102 is YES, the control program moves to step S103 in which the defrosting facilitating mode is performed.

When the refrigerant suction temperature Tsi detected by the suction temperature sensor 57 is not higher than the predetermined temperature (e.g., 5° C.) in step S101, a mode other than the defrosting facilitating mode is performed in step S104. Furthermore, when the defrosting control is not performed at step S102, a mode other than the defrosting facilitating mode is performed in step S104.

Next, in step S105, the respective parameters other than the defrosting facilitating mode are determined in order to determine the operating ratio of the blower fan 16*a*. For example, the parameters other than the defrosting facilitating mode include the outside air temperature Tam, the room temperature Tr of the vehicle compartment, the vehicle speed Vs and the refrigerant pressure Pd. In the cooler cycle, the same determination value is used for the outside air temperature Tam, regardless of the defrosting mode or a mode other than the defrosting mode, in step S105.

Next, in step S106, the operating ratio of the blower fan 16*a* is determined by using the determination results of steps S103, S104, S105.

In the present embodiment, when the cooler cycle is selected in the defrosting control of the outdoor heat exchanger 16, the control program moves to step S101 from step S80.

When the refrigerant suction temperature Tsi detected by the suction temperature sensor 57 is not higher than the predetermined temperature (e.g., 5° C.) in the defrosting control, a mode other than the defrosting facilitating mode is performed in step S104. In the winter, in the thermal load calculation of step S105, it is determined that the outside air temperature Tam is a low outside air temperature lower than 25° C., and that inside air temperature Tr is a low inside air temperature lower than 28° C. In this case, the thermal load is in a "low room temperature and low outside air temperature", and the operation mode is a mode other than the defrosting facilitating mode. Thus, when the vehicle speed Vs is a low vehicle speed, the blower fan 16*a* is operated at the "LO" so that the air blowing capacity becomes minimum, as in step S106. In contrast, when the vehicle speed Vs is a high vehicle speed, the blower fan 16*a* is set at the "OFF"

When the refrigerant suction temperature Tsi detected by the suction temperature sensor 57 is higher than the predetermined temperature (e.g., 5° C.) in the defrosting control, the defrosting facilitating mode is determined in step S103. In the winter, in the thermal load calculation of step S105, it is determined that the outside air temperature Tam is a low outside air temperature lower than 25° C., and that inside air temperature Tr is a low inside air temperature lower than 28° C. In this case, the thermal load is in a "low room temperature and low outside air temperature", and the operation mode is the defrosting facilitating mode. Thus, the blower fan 16*a* is set at the "HI" so that air blowing capacity of the blower fan 16*a* becomes maximum, regardless of the vehicle speed.

In the present embodiment, when the refrigerant suction temperature Tsi is higher than 5° C., it is determined that the defrosting proceeds, and the defrosting facilitating mode is set. Thus, when the refrigerant suction temperature Tsi is higher than 5° C. in the defrosting control, the operating ratio of the blower fan 16*a* is set higher than that when the refrigerant suction temperature Tsi is lower than 5° C. For example, in the winter where the thermal load is the "low outside air temperature and low room temperature", the operating ratio of the blower fan 16*a* is set at the "HI" in the defrosting facilitating mode, and the operating ratio of the blower fan 16*a* is set at the "LO" or the "OFF" in a mode other than defrosting facilitating mode.

When the melted water remains on the outdoor heat exchanger 16 in the defrosting control, frost is re-formed on the outdoor heat exchanger 16 immediately after the operation of the heat pump cycle is re-started. In the present embodiment, when it is determined that the defrosting proceeds, the blower fan 16*a* is operated at the "HI" so that melted water is removed from the outdoor heat exchanger 16 in the defrosting control, thereby reducing the frost due to the remaining water.

When the blower fan 16*a* is operated at the "HI" in the defrosting control, the outdoor heat exchanger 16 is vibrated by the variation of the blower fan 16*a*. Thus, water or ice contained in the water can easily fall downwardly from the outdoor heat exchanger 16 due to the vibration of the outdoor heat exchanger 16.

In the present embodiment, the predetermined temperature for determining the refrigerant suction temperature Tsi is set at 5° C. so that it is determined whether the melting of frost proceeds. However, the predetermined temperature for determining whether the melting of frost proceeds may be set at other temperature, or may be suitably changed. In the present embodiment, the predetermined temperature for determining the refrigerant suction temperature Tsi is set at 5° C. so that it is determined whether the melting of frost proceeds. However, a defrosting time may be used instead of the refrigerant suction temperature Tsi in step S101. For example, when the defrosting time after the start of the defrosting control passes a predetermined time, it may be determined that the melting of frost proceeds.

Eighth Embodiment

An eighth embodiment of the present invention will be described with reference to FIGS. 1 to 8 and 17.

In step S12 of FIG. 6, an operating ratio (e.g., number of revolutions) of the blower fan 16a for blowing outside air toward the outdoor heat exchanger 16 is determined. In the present embodiment, the control of step S12 of FIG. 6 will be described in detail. In the present embodiment, in an initial defrosting stage of the outdoor heat exchanger 16, the operating ratio of the blower fan 16a is set lower than that in a stage other than the initial defrosting stage. In this case, an entire defrosting time can be made shorter.

Figure 17:
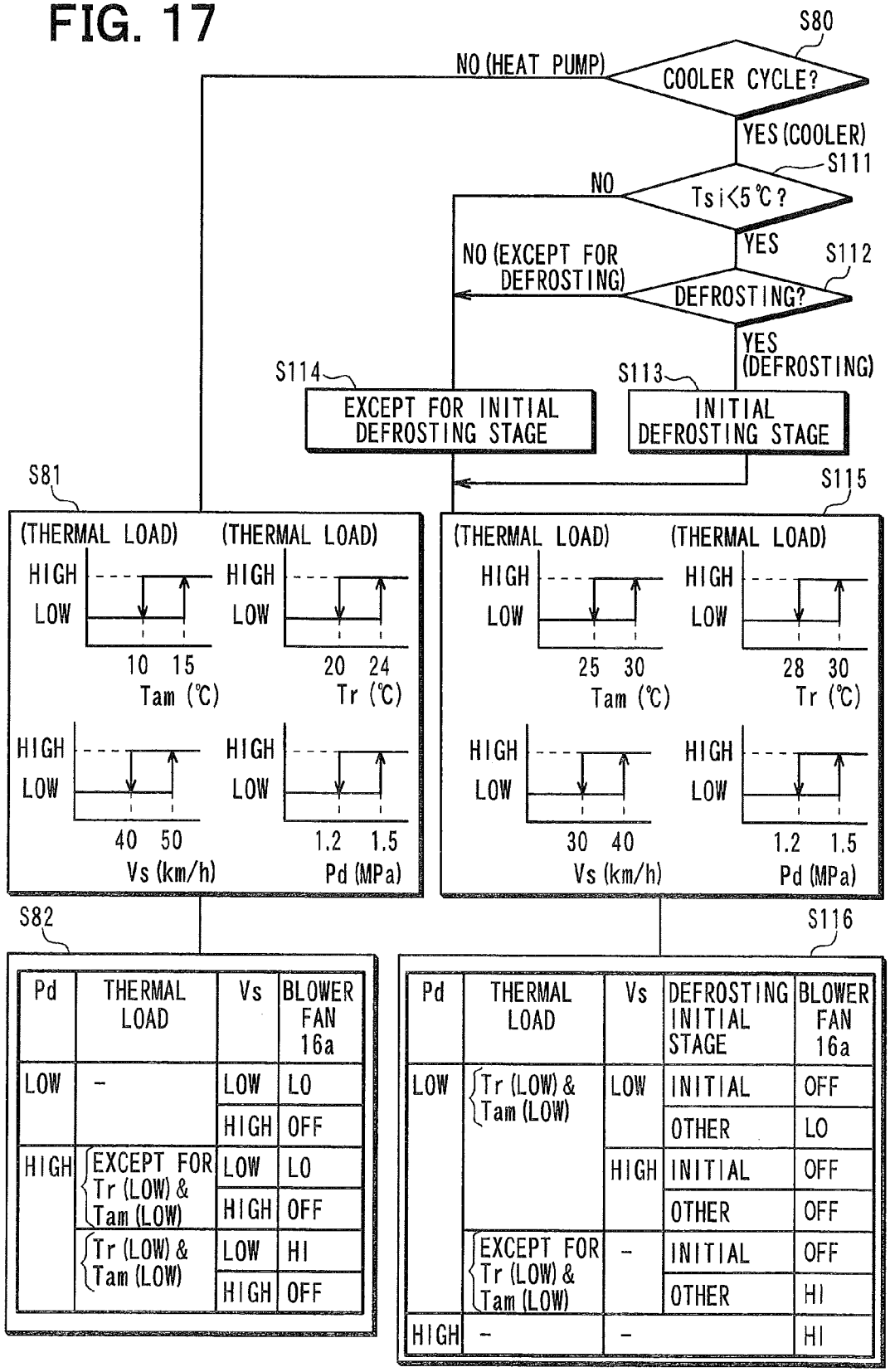
FIG. 17 is a flowchart showing a part of the control performed by an air conditioner for a vehicle according to an eighth embodiment of the invention.

FIG. 17 is a flowchart for determining the operating ratio of the blower fan 16a in the present embodiment. In the present embodiment, the parts different from those of the fifth embodiment will be mainly described.

In step S80, it is determined whether the refrigeration cycle 10 is operated as a cooler cycle including the defrosting mode. At this time, when the operation mode of the refrigeration cycle 10 is the heat pump cycle, steps S81 and S82 are performed similarly to steps S81 and S82 of FIG. 14 of the fifth embodiment. When the operation mode of the refrigeration cycle 10 is the cooler cycle, the control program moves from step S80 to step S111 and the following steps, and respective parameters including a defrosting stage are determined in order to determine the operating ratio of the blower fan 16a. For example, it is determined whether the defrosting mode is in an initial defrosting stage or in a stage other than the initial defrosting stage. The initial defrosting stage is a defrosting stage before the melting of frost attached to the outdoor heat exchanger 16 proceeds. For example, in the initial defrosting stage, the frost remaining area is larger than the frost melting area on the outdoor heat exchanger 16.

For example, in step S111, it is determined whether or not the refrigerant suction temperature Tsi detected by the suction temperature sensor 57 is lower than a predetermined temperature (e.g., 5° C.). When the refrigerant suction temperature Tsi detected by the suction temperature sensor 57 is lower than the predetermined temperature (e.g., 5° C.) in step S111, it is determined whether the operation mode is the defrosting mode in step S112. When the determination of step S112 is YES, the control program moves to step S113 in which the initial defrosting stage is determined.

When the refrigerant suction temperature Tsi detected by the suction temperature sensor 57 is not lower than the predetermined temperature (e.g., 5° C.) in step S111, or when the defrosting is not performed at step S112, the control program moves to step S114 in which a stage other than the initial defrosting stage is determined. Furthermore, when the defrosting is not performed at step S112, the stage other than the initial defrosting stage is determined in step S114.

Next, in step S115, the respective parameters other than the initial defrosting stage are determined in order to determine the operating ratio of the blower fan 16a. For example, the parameters other than the initial defrosting stage include the outside air temperature Tam, the room temperature Tr of the vehicle compartment, the vehicle speed Vs and the refrigerant pressure Pd. In the present embodiment, the same determination value is used for the outside air temperature Tam in the cooler cycle, regardless of the defrosting mode or a mode other than the defrosting mode.

Next, in step S116, the operating ratio of the blower fan 16a is determined by using the determination results of steps S113, S114, S115.

In the present embodiment, because the cooler cycle is selected in the defrosting control of the outdoor heat exchanger 16, the control program moves to step S111 from step S80.

When the refrigerant suction temperature Tsi detected by the suction temperature sensor 57 is higher than the predetermined temperature (e.g., 5° C.) in the defrosting control, the stage other than the initial defrosting stage is determined in step S114. In the winter, in the thermal load calculation of step S115, it is determined that the outside air temperature Tam as the thermal load is a low outside air temperature lower than 25° C., and that the room temperature Tr as the thermal load is a low room temperature lower than 28° C. In this case, the thermal load is in a "low room temperature and low outside air temperature", in the stage other than the initial defrosting stage. Thus, when the vehicle speed Vs is a low vehicle speed, the blower fan 16a is operated at the "LO" so that the air blowing capacity becomes minimum, as in step S116. In contrast, when the vehicle speed Vs is a high vehicle speed, the blower fan 16a is set at the "OFF".

When the refrigerant suction temperature Tsi detected by the suction temperature sensor 57 is lower than the predetermined temperature (e.g., 5° C.) in the defrosting control, the initial defrosting stage is determined in step S113. In the winter, in the thermal load calculation of step S115, it is determined that the outside air temperature Tam as the thermal load is a low outside air temperature lower than 25° C., and that inside air temperature Tr as the thermal load is a low inside air temperature lower than 28° C. In this case, the thermal load is the "low room temperature and low outside air temperature", and the defrosting mode is in the initial defrosting stage. Thus, the blower fan 16a is set at the "OFF" so that air blowing capacity of the blower fan 16a becomes zero, regardless of the vehicle speed Vs.

In the present embodiment, when the refrigerant suction temperature Tsi is lower than 5° C., it is determined that the defrosting mode is in the initial defrosting stage. In this case, the operating ratio of the blower fan 16a is set lower (e.g., OFF) than that when the refrigerant suction temperature Tsi is higher than 5° C. Thus, in the initial defrosting stage, the air blowing capacity of the blower fan 16a is reduced than that in the stage other than the initial defrosting stage, during the defrosting control of the outdoor heat exchanger 16.

If air is blown to the outdoor heat exchanger 16 in the initial defrosting stage, the heat of the refrigerant is radiated in the outdoor heat exchanger 16, and a temperature increase in the outdoor heat exchanger 16 is reduced, thereby restricting the defrosting of the outdoor heat exchanger 16.

According to the present embodiment, the blower fan 16a is stopped in the initial defrosting stage, thereby facilitating the temperature increase of the outdoor heat exchanger 16 in the defrosting control. Therefore, the defrosting time can be effectively reduced.

In the above-described example of the present embodiment, the blower fan 16a is stopped in the initial defrosting stage. However, in the initial defrosting stage, the operating ratio of the blower fan 16a may be set lower than that in the stage other than initial defrosting stage in the defrosting mode. For example, the operating ratio of the blower fan 16a may be set at a level lower than the "LO", in the initial defrosting stage.

In the present embodiment, the predetermined temperature for determining the refrigerant suction temperature Tsi is set at 5° C. in step S111 so that the initial defrosting stage is determined. However, the predetermined temperature for determining initial defrosting stage may be set at other temperature, or may be suitably changed. In the present embodiment, the predetermined temperature for determining the refrigerant suction temperature Tsi is set at 5° C. so that the initial defrosting stage is determined. However, a defrosting time may be used instead of the refrigerant suction temperature Tsi. For example, when the defrosting time after the start of the defrosting control is shorter than a predetermined time, the initial defrosting stage may be determined. Furthermore, when the defrosting time after the start of the defrosting control is longer than the predetermined time, the stage other than the initial defrosting stage may be determined.

Other Embodiment (1) In the above-described embodiments, the refrigeration cycle 10 is provided with two indoor heat exchangers composed of the indoor condenser 12 and the indoor evaporator 26, as shown in FIGS. 1 to 4. However, the refrigeration cycle 10 may be provided with a single indoor heat exchanger in the vehicle compartment, if the refrigeration cycle 10 is switchable between the heat pump cycle and the cooler cycle.

(2) In the above-described third to eighth embodiments, the air conditioning controller outputs an engine operation request signal to the engine EG when the outdoor heat exchanger 16 is frosted, similarly to the above-described first embodiment. However, the defrosting control according to the third to eighth embodiments may be performed without outputting the engine request signal from the air conditioning controller 50 to the engine EG.

(3) The above described embodiments may be suitably combined if there is no contradiction therebetween.

(4) In the above-described embodiments, the air conditioner according to the invention is used for a hybrid car. However, the air conditioner according to the invention may be suitably used for an idling-stop vehicle or other kinds of vehicles.

Such changes and modifications are to be understood as being within the scope of the present invention as defined by the appended claims.

What is claimed is:

1. An air conditioner for a vehicle, comprising:
a vapor compression refrigeration cycle including an outdoor heat exchanger configured to perform heat exchange between refrigerant and air outside of a vehicle compartment, and an indoor heat exchanger configured to perform heat exchange between the refrigerant and air to be blown into the vehicle compartment, the vapor compression refrigerant cycle being configured to be switchable between a heat pump cycle in which a heat amount absorbed from the outdoor heat exchanger is radiated to the indoor heat exchanger to heat air to be blown into the vehicle compartment, and a cooler cycle in which a heat amount absorbed from the indoor heat exchanger is radiated to the outdoor heat exchanger; and
a controller configured to control the vapor compression refrigeration cycle, wherein
the controller causes the vapor compression refrigeration cycle to be operated as the cooler cycle so as to perform a defrosting control of the outdoor heat exchanger when the controller determines that the outdoor heat exchanger is frosted,
the controller is configured to perform a pre-air conditioning control that starts air conditioning in the vehicle compartment when a passenger turns on a predetermined switch before riding in the vehicle, and
in a case where the controller determines that the outdoor heat exchanger is frosted, the controller prohibits the defrosting control when performing the pre-air conditioning control, and performs the defrosting control when the pre-air conditioning control is not performed.

2. The air conditioner according to claim 1, wherein
the vapor compression refrigeration cycle includes a compressor that compresses and discharges the refrigerant, and
the controller prohibits the defrosting control by stopping the compressor when the pre-air conditioning control is performed in the case where the controller determines that the outdoor heat exchanger is frosted.

3. The air conditioner according to claim 2, wherein
the controller sets a maximum number of revolutions of the compressor at 0 when the pre-air conditioning control is performed in the case where the controller determines that the outdoor heat exchanger is frosted, and
the controller sets the maximum number of revolutions of the compressor at a predetermined value when the pre-air conditioning control is not performed in the case where the controller determines that the outdoor heat exchanger is frosted.

4. The air conditioner according to claim 3, wherein
the controller calculates a present temporary number of revolutions of the compressor based on a previous number of revolutions of the compressor, and
the controller sets the smaller one of the maximum number of revolutions of the compressor or the present temporary number of revolutions of the compressor as a present number of revolutions of the compressor.

5. The air conditioner according to claim 1, further comprising
a heat core configured to heat air to be blown into the vehicle compartment by using coolant of an engine of the vehicle as a heat source, and
an engine controller that controls the engine, wherein
the engine controller sets the engine to be not operated in the pre-air conditioning control.

* * * * *